(12) United States Patent
Bergesch et al.

(10) Patent No.: US 12,401,175 B2
(45) Date of Patent: Aug. 26, 2025

(54) BUSWAY CONNECTION THROUGH EXTERIOR WALL

(71) Applicant: SCHNEIDER ELECTRIC IT CORPORATION, Foxboro, MA (US)

(72) Inventors: Joseph H. Bergesch, Chesterfield, MO (US); Tuan Duc Hoang, Glen Allen, VA (US); Brooks Edward Peters, Oxford, OH (US); Eddy David Rosell, Miami, FL (US); Rong Long, St. Louis, MO (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 309 days.

(21) Appl. No.: 17/949,521

(22) Filed: Sep. 21, 2022

(65) Prior Publication Data
US 2024/0097410 A1   Mar. 21, 2024

(51) Int. Cl.
*H02B 1/20* (2006.01)
*H02G 3/14* (2006.01)

(52) U.S. Cl.
CPC .............. *H02B 1/202* (2013.01); *H02G 3/14* (2013.01)

(58) Field of Classification Search
CPC ............. H02B 1/20; H02B 1/202; H02G 3/14
USPC ....................................................... 174/481
See application file for complete search history.

(56) References Cited

U.S. PATENT DOCUMENTS

| 10,285,301 B1 | 5/2019 | Bailey et al. |
| 2012/0222880 A1* | 9/2012 | Dinh ..................... H02G 3/14 174/50 |
| 2022/0173584 A1 | 6/2022 | Stifter, Jr. et al. |

FOREIGN PATENT DOCUMENTS

| CN | 211701401 U | 10/2020 |
| CN | 113922307 A | 1/2022 |
| KR | 100811055 B1 | 3/2008 |

OTHER PUBLICATIONS

Extended European Search Report from corresponding European Application No. 23198844.5 dated Mar. 1, 2024.
Ls Cable & System: "LS C&S Busduct System", Feb. 6, 2018 (Feb. 6, 2018), pp. 1-44, XP093129280, Retrieved from the Internet: URL:https://busolmexico.com/wp-content/uploads/2020/10/CAT_Ex-Way-UL.pdf [retrieved on Feb. 8, 2024].

* cited by examiner

*Primary Examiner* — Tremesha W Burns
(74) *Attorney, Agent, or Firm* — Lando & Anastasi, LLP

(57) ABSTRACT

A modular data center includes an outer wall having an opening formed therein. The opening is configured to enable a busway to pass through the outer wall. The modular data center further includes an electrical box configured to be coupled to the busway. The electrical box is positioned inboard with respect to the outer wall. The modular data center further includes a shroud configured to extend through the opening of the outer wall. The shroud includes a plurality of outer edges coupled to an outer surface of the outer wall. The modular data center further includes a cover, including a cover opening, configured to enable the busway to pass through the cover opening, and to at least partially seal the opening of the outer wall having the busway passing therethrough.

34 Claims, 18 Drawing Sheets

BUSWAY CONNECTION THROUGH EXTERIOR WALL

BACKGROUND OF DISCLOSURE

1. Field of Disclosure

This disclosure is directed to busways used in data centers, and more particularly to a system and method of extending a busway through an outer or exterior wall of a facility, such as a data center or a modular data center.

2. Discussion of Related Art

Busway electrical distribution systems are well known in the art of electrical distribution. Busway systems are comprised of a number of factory-assembled sections, each including a number of individually insulated generally flat electrical conductors or busbars stacked one upon another and enclosed within a housing which provides protection and support for the busbars. For example, typical powerbus busway systems have ten-foot (or four-foot) sections of flat, stacked, electrical conductors for transporting electrical energy from a point A to a point B, while distributing the electrical energy to various electrical loads. Busway construction is modular, and, in many ways, is superior to cable and conduit systems from an installation standpoint.

Typically, a busway can be used internally within a facility or externally to supply power to a facility, such as a data center or a modular data center. Although the busway can pass through a closed wall section of the facility, the busway is not typically terminated at the interface. Further, the busway is typically not rated to go through a closed wall section of the facility.

SUMMARY OF DISCLOSURE

One aspect of the present disclosure is directed to a modular data center comprising an outer wall having an opening formed therein. The opening is configured to enable a busway to pass through the outer wall. The modular data center further comprises an electrical box configured to be coupled to the busway. The electrical box is positioned inboard with respect to the outer wall. The modular data center further comprises a shroud configured to extend through the opening of the outer wall. The shroud includes a plurality of outer edges coupled to an outer surface of the outer wall. The modular data center further comprises a cover, including a cover opening, configured to enable the busway to pass through the cover opening, and to at least partially seal the opening of the outer wall having the busway passing therethrough.

Embodiments of the modular data center further may include configuring the shroud with a plurality of walls that extend in a direction generally perpendicular to the plurality of outer edges. The plurality of outer edges may be configured to extend in an outboard direction with respect to the outer wall. A bottom wall of the plurality of walls of the shroud may be sloped downwardly toward the plurality of outer edges. Inner surfaces of the plurality of outer edges each may include a seal configured to engage the outer surface of the outer wall. The shroud further may include a plurality of inner edges configured to be coupled to the electrical box. The plurality of inner edges may be configured to extend in an inboard direction with respect to the outer wall. The cover may be configured to be secured to the plurality of outer edges of the shroud. The cover opening may be sized to receive the busway. The cover opening may include a gasket to create at least a partial seal between the busway and the cover. The cover further may include at least one slider plate mounted on the cover adjacent an edge of the opening. The at least one slider plate may be configured to improve the seal between the busway and the cover. The cover may include one or more small openings formed along a bottom edge of the cover. The modular data center further may include a shield secured to the outer wall and positioned over the busway. The shield may include a top wall and two side walls extending downwardly from the top wall. The modular data center further may include at least one heater secured to a wall of the shroud. The modular data center further may include a thermostat coupled to the at least one heater, the thermostat being configured to control the at least one heater. The at least one heater may include two heaters. The modular data center further may include a ceiling coupled to the outer wall, with the ceiling including at least one support member configured to support the electrical box. The modular data center further may include a clamp configured to secure the electrical box, with the clamp being coupled to the at least one support member to enable the electrical box slide with respect to the ceiling.

Another aspect of the present disclosure is directed to an assembly to protect a busway configured to be coupled to an electrical box, with the busway extending through an opening of an outer wall of a modular data center. In one embodiment, the assembly comprises a shroud configured to extend through the opening of the outer wall. The shroud includes a plurality of outer edges coupled to an outer surface of the outer wall. The assembly further comprises a cover, including a cover opening, configured to enable the busway to pass through the cover opening, and to at least partially seal the opening of the outer wall having the busway extending therethrough.

Embodiments of the assembly further may include configuring the shroud with a plurality of walls that extend in a direction generally perpendicular to the plurality of outer edges. The plurality of outer edges may be configured to extend in an outboard direction with respect to the plurality of walls. A bottom wall of the plurality of walls of the shroud may be sloped downwardly toward the plurality of outer edges. Inner surfaces of the plurality of outer edges each may include a seal configured to engage the outer surface of the outer wall. The shroud further may include a plurality of inner edges configured to be coupled to the electrical box. The plurality of inner edges may be configured to extend in an inboard direction with respect to the plurality of wall. The cover may be configured to be secured to the plurality of outer edges of the shroud. The cover opening may be sized to receive the busway. The cover opening may include a gasket to create at least a partial seal between the busway and the cover. The cover further may include at least one slider plate mounted on the cover adjacent an edge of the opening. The at least one slider plate may be configured to improve the seal between the busway and the cover. The cover may include one or more small openings formed along a bottom edge of the cover. The assembly further may include a shield secured to the outer wall and positioned over the busway. The shield may include a top wall and two side walls extending downwardly from the top wall. The assembly further may include at least one heater secured to a wall of the shroud. The assembly further may include a thermostat coupled to the at least one heater. The thermostat may be configured to control the at least one heater. The at least one heater may include two heaters.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
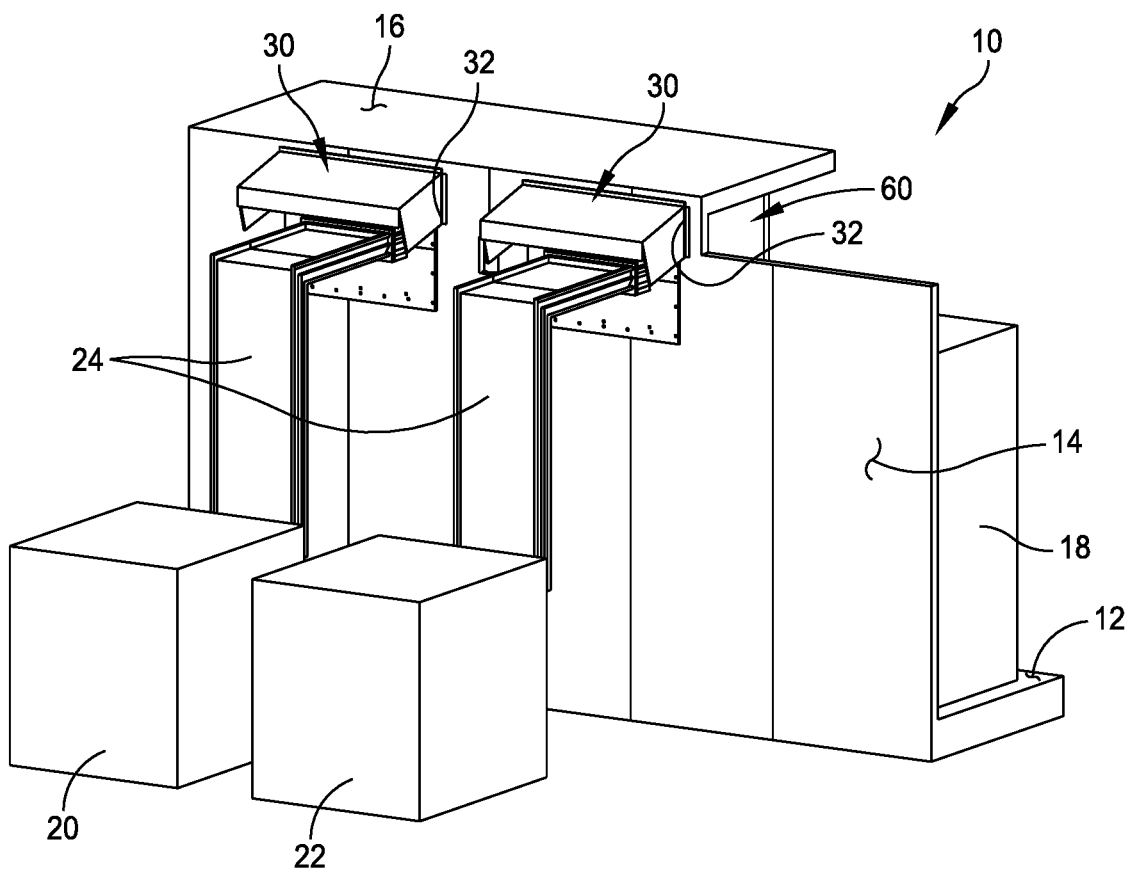
FIG. 1 is a perspective view of a portion of a modular data center of an embodiment of the present disclosure.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Busways may be used to provide power to modules positioned within configurable racks located within the data center. A typical busway includes a sheet metal duct having resin insulated copper or aluminum busbars to conduct a substantial current of electricity. Busways are used in many electrical power distribution devices, such as power modules, switching apparatus, distribution apparatus, and batteries. Oftentimes, busways are connected to busway cable tap boxes, which are used to draw power from the busways. In certain embodiments, the busway cable tap box is mounted on a ceiling and includes a busway splice joint which mates with the busway.

Modular data centers provide additional challenges. Previously, when installers of electronic equipment desired to run a busway to a modular data center, the installer was required to wait until the modular data center was delivered and then create an opening in an exterior wall of the modular data center. Also, the installer needed to create a watertight seal around the opening to ensure water was prohibited from entering the modular data center.

Next, the installer would be required to connect the busway to the equipment inside the modular data center, including a busway cable tap box, thereby requiring the installer to enter the modular data center. Sometimes, customers do not want to provide access to service personnel within the modular data center for a variety of reasons, including the prevention of damage caused by the installer when connecting cables to the equipment within the modular data center. In addition, switchgear can be tested and commissioned at the factory to save time at the customer site.

The present disclosure offers a solution that enables a continuation of a busway through an exterior wall while weatherproofing the opening through which the busway extends. Installers need not access inside the building thereby ensuring the protection of the facility and the cleanliness of the facility while allowing work to continue without the customer needing to be present.

Figure 3:
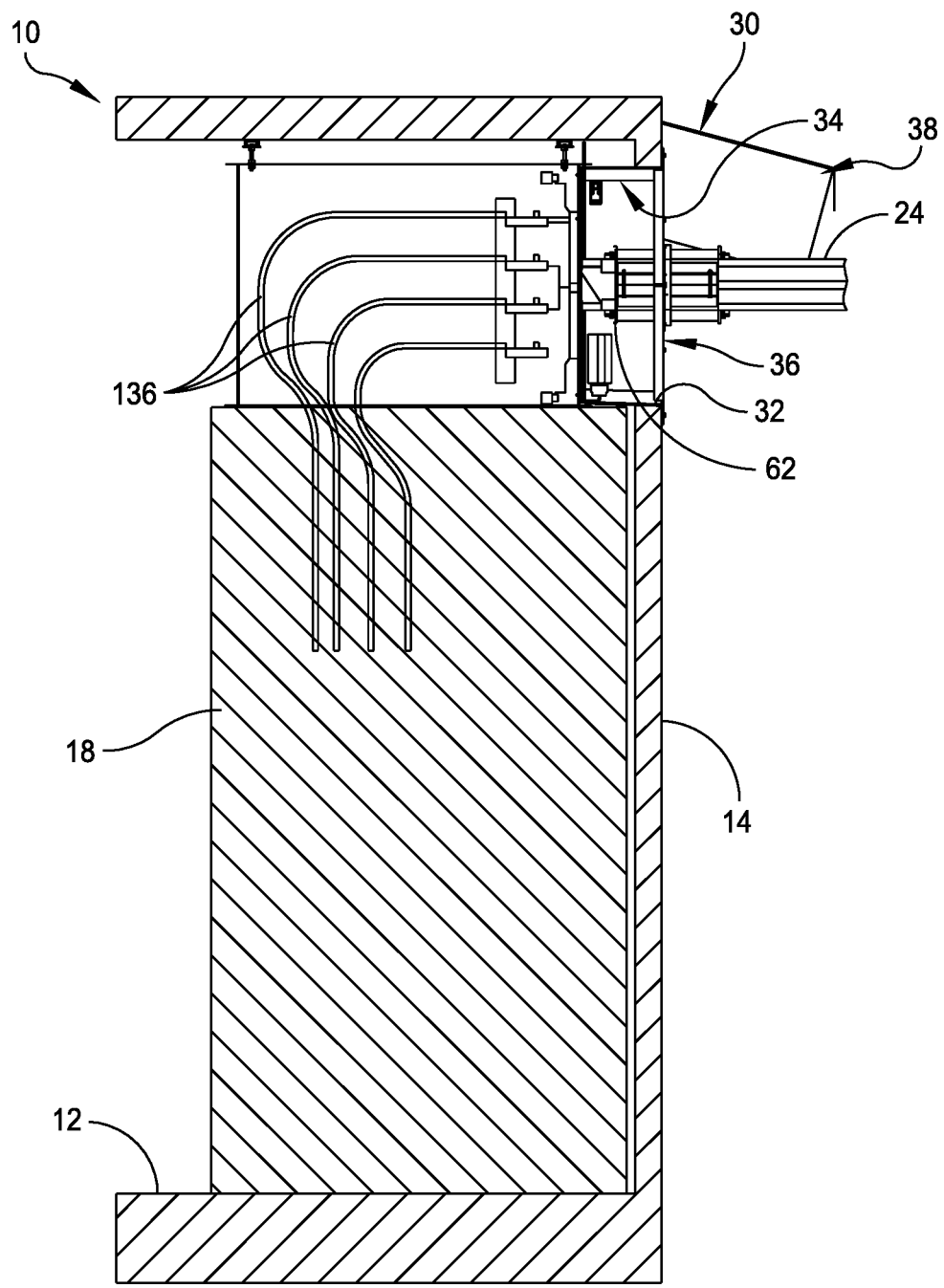
FIG. 3 is a cross-sectional view of the modular data center taken along line 3-3 in FIG. 2.

Referring to FIG. 1, a portion of a modular data center is generally indicated at 10. In one embodiment, the modular data center 10 is a modular structure that is designed to house and support electrical equipment. As shown, the modular data center 10 includes a floor 12, a wall 14 including several panels, and a ceiling 16. In some embodiments, the modular data center 10 further includes a variety of electronic modules, e.g., switchgear 18, supported by the floor 12 of the modular data center. Positioned outside the modular data center 10 are electrical equipment, such as a transformer 20 and a generator 22. Although two units of electrical equipment 20, 22 are shown and described herein, any number of units of equipment may be provided based on the size of the modular data center 10. As shown, a busway 24 is connected to the transformer 20 to provide electrical connection between the transformer 20 and a cable tap box 60 (FIG. 3). Similarly, another busway 24 is connected to the generator 22 to provide electrical connection between the generator and another cable tap box 60 provided within the modular data center 10. There are openings in the wall 14 to enable the busways 24 to connect the transformer 20 and the generator 22 to their respective cable tap boxes.

Figure 2:
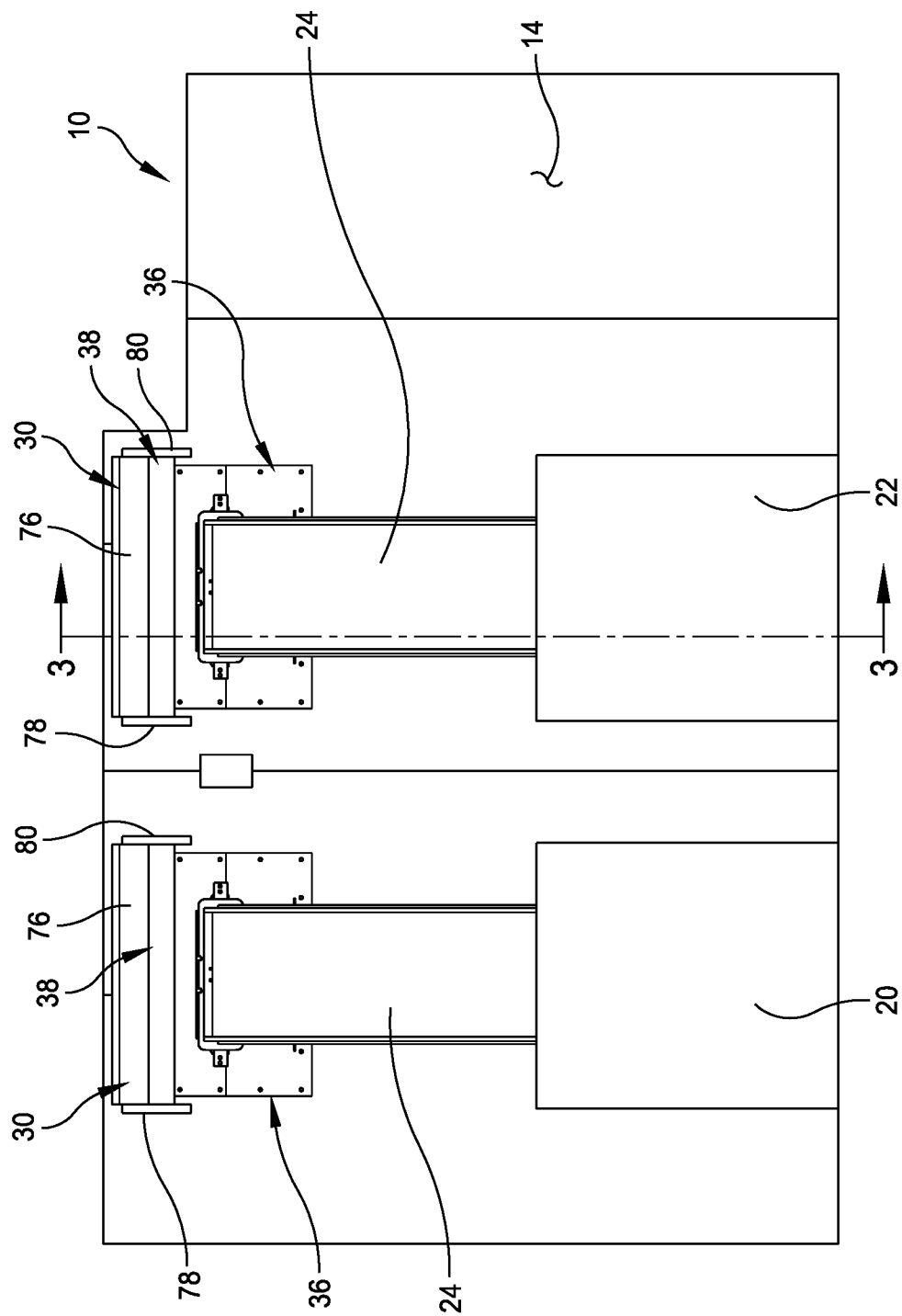
FIG. 2 is a front view of the modular data center.

Referring additionally to FIGS. 2 and 3, the modular data center 10 further includes an assembly, generally indicated at 30, that is provided to enable and protect the busway 24 as it passes through an opening 32 provided in the wall 14 of the modular data center. As shown, the assembly 30 includes a shroud, generally indicated at 34, and a cover, generally indicated at 36. The shroud 34 functions as a guide to enable the busway 24 to pass through the opening 32 and to connect to the cable tap box 60. The cover 36 functions to enclose an opening created by the shroud 34 and to seal the opening to prevent unwanted moisture from entering the modular data center 10. The assembly 30 further includes a shield, generally indicated at 38, which is secured to the wall 14 of the modular data center 10 above the opening 32. As its name implies, the shield 38 is provided to divert moisture, e.g., rain, from the opening 32 and the opening created by the shroud 34 and protected by the cover 36 thereby providing additional protection to the busway 34 and its connection to the cable tap box 60 provided within the shroud.

Figure 4A:
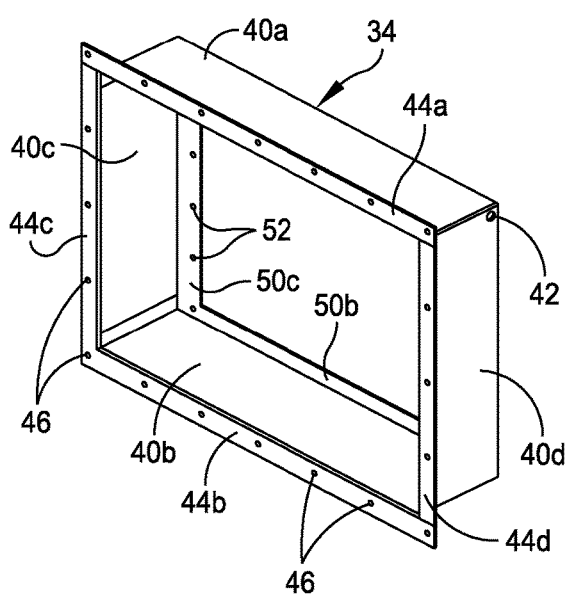
FIG. 4A is a front perspective view of a shroud of an embodiment of the present disclosure.
Figure 4B:
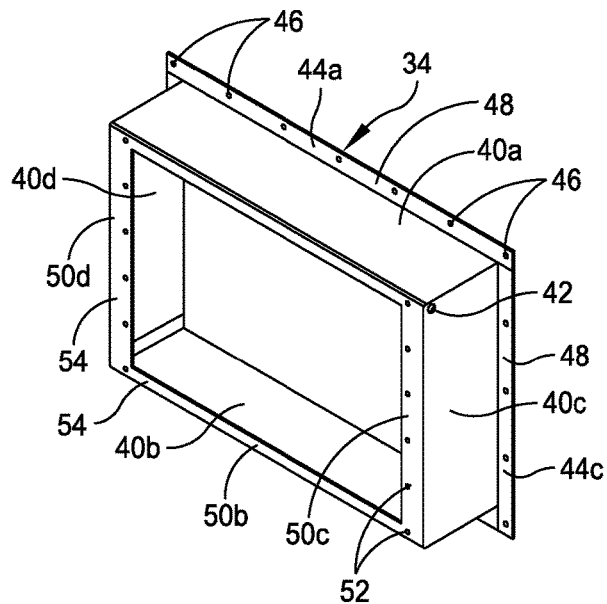
FIG. 4B is a back perspective view of the shroud shown in FIG. 4A.
Figure 4C:
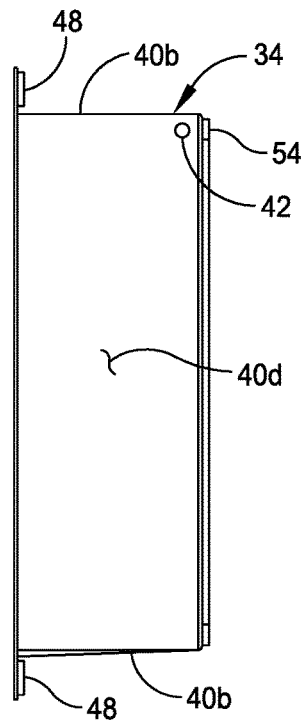
FIG. 4C is a side view of the shroud shown in FIGS. 4A and 4B.

Referring to FIGS. 4A-4C, the shroud 34 is a generally rectangular structure that is configured to extend through the opening 32 of the wall 14 of the modular data center 10. As shown, the shroud 34 includes four side walls 40a, 40b, 40c, 40d, each having a relatively substantial width. The width of the side walls 40a-40d is sufficient to enable the connection of the busway 24 to the cable tap box 60. In the shown embodiment, side walls 40a, 40b are longer than side walls 40c, 40d to create a rectangular structure. However, it should be understood that the size and shape of the shroud 34 can be configured to achieve a desired size and shape to accommodate the size and shape of the busway 24 that extends through the opening 32 of the wall 14. The shorter side walls 40c, 40d each can include a relatively small opening 42 formed therein to enable wires, e.g., wires for heater elements, to pass through the shroud 34.

The shroud 34 further includes four outer edges 44a, 44b, 44c, 44d, one for each side wall 40a, 40b, 40c, 40d, respectively, which extend in an outboard direction generally perpendicular to their respective side walls. The outer edges 44a-44d are welded or bent to their respective side walls 40a-40d and positioned to engage and secure the shroud 34 to the outer surface of the wall 14, with the side walls extending into an interior of the modular data center 10. As shown, the outer edges 44a-44d of the shroud 34 have a plurality of openings, each indicated at 46, which are spaced apart from one another to secure the shroud to the wall 14 of the modular data center 10. In one embodiment, screw fasteners (not shown) can be provided to secure the shroud 34 to the wall 14. Further, the outer edges 44a-44d of the shroud 34 have inner surfaces having a seal 48 that is configured to engage the outer surface of the wall 14 to seal the shroud to the wall. In a certain embodiment, a sealing tape may be applied to the inner surfaces of the outer edges 44a-44d to seal the shroud 34 to the wall 14.

The shroud 34 further includes four inner edges 50a, 50b, 50c, 50d, one for each side wall 40a, 40b, 40c, 40d, respectively, that extend in an outboard direction generally perpendicular to their respective side walls. The inner edges 50a-50d are welded or bent to their respective side walls 40a-40d and provided to engage and secure the shroud 34 to the cable tap box 60, which is sometimes referred to herein as an electrical box. As with the outer edges 44a-44d of the shroud 34, the inner edges 50a-50d of the shroud 34 have a plurality of openings, each indicated at 52, that are spaced apart from one another to secure the shroud to the cable tap box 60. In one embodiment, screw fasteners can be provided to secure the shroud 34 to the cable tap box 60. Further, the inner edges 50a-50d of the shroud 34 have outer surfaces having a seal 54 that is configured to engage the outer surface of the cable tap box 60 to seal the shroud to the cable tap box.

In one embodiment, with particular reference to FIG. 4C, a bottom longer side wall 40b of the shroud 34 is sloped downwardly from the inner edges 50a-50d to the outer edges 44a-44d. When mounted on the wall 14, the top longer side wall 40a of the shroud extends generally perpendicularly from the wall 14 whereas the bottom longer side wall 40b slopes downwardly with respect to a horizontal plane. The subtle slope of the bottom longer side wall 40b enables fluid, e.g., water, to drain from the shroud 34 should fluid enter the shroud.

Figure 5:
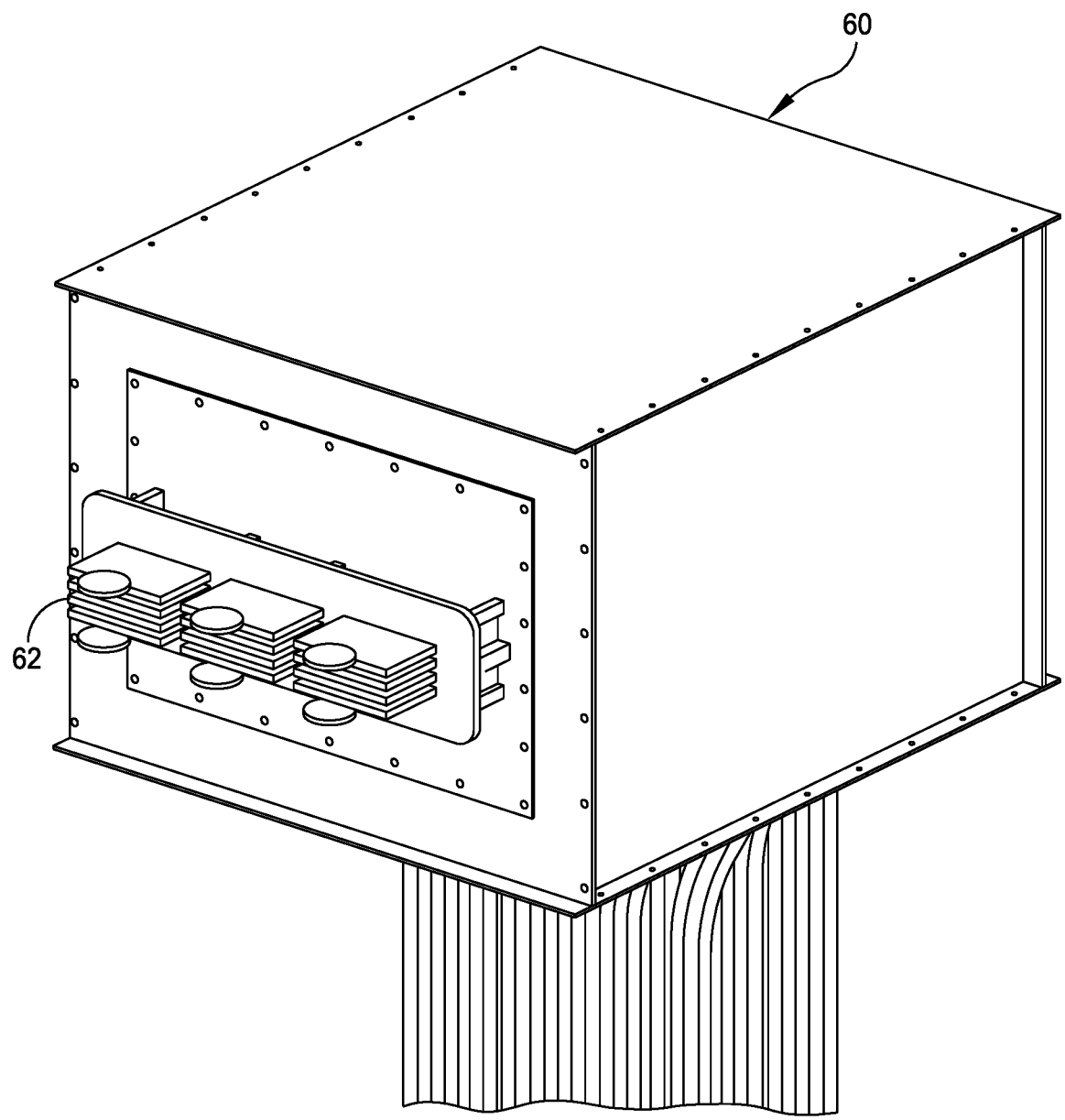
FIG. 5 is a perspective view of a cable tap box.

Referring to FIG. 5, an exemplary cable tap box 60 is shown and described herein. As shown, the cable tap box 60 includes a busway interface 62 that is configured to connect the busway 24 to the cable tap box. In one embodiment, the cable tap box 60 is an outdoor cable tap box that is rated for 4000 amps (A). Although oriented in a horizontal fashion, the busway interface 62 of the cable tap box 60 can be oriented vertically based on a desired use. The busway 24 is connected to the busway interface 62 of the cable tap box 60 in a manner shown in FIG. 3.

Figure 6:
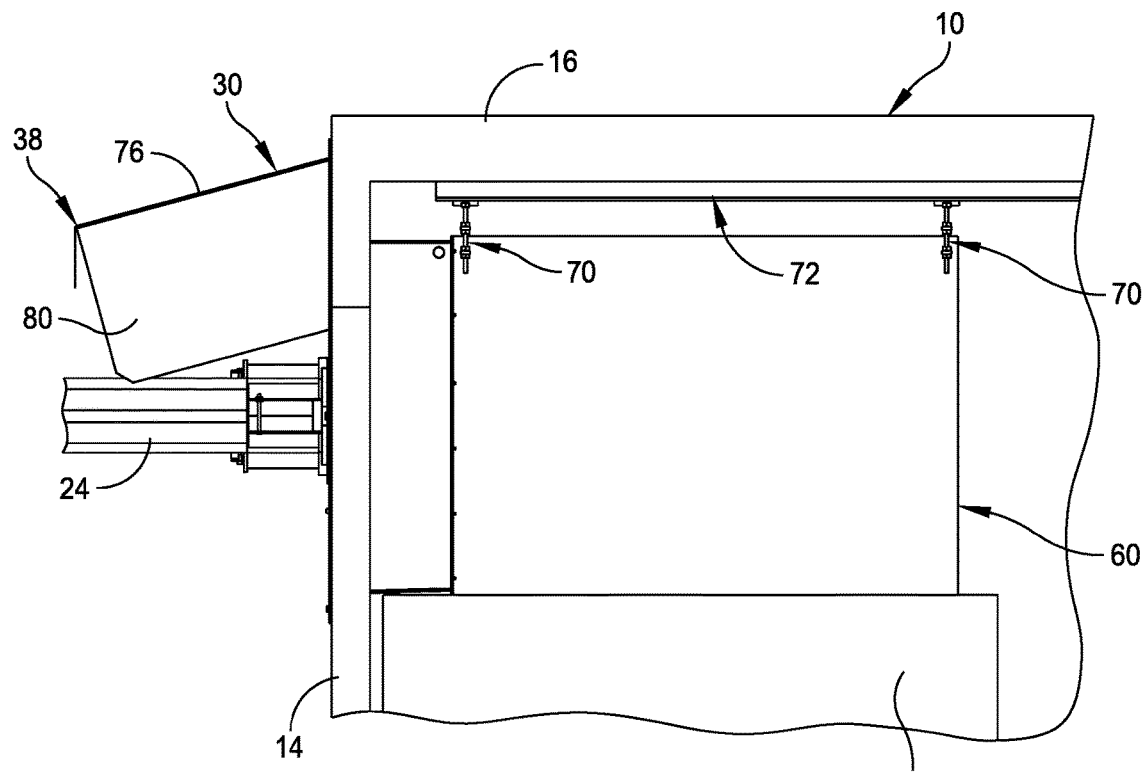
FIG. 6 is a side cross-sectional view of a portion of the modular data center.
Figure 7:
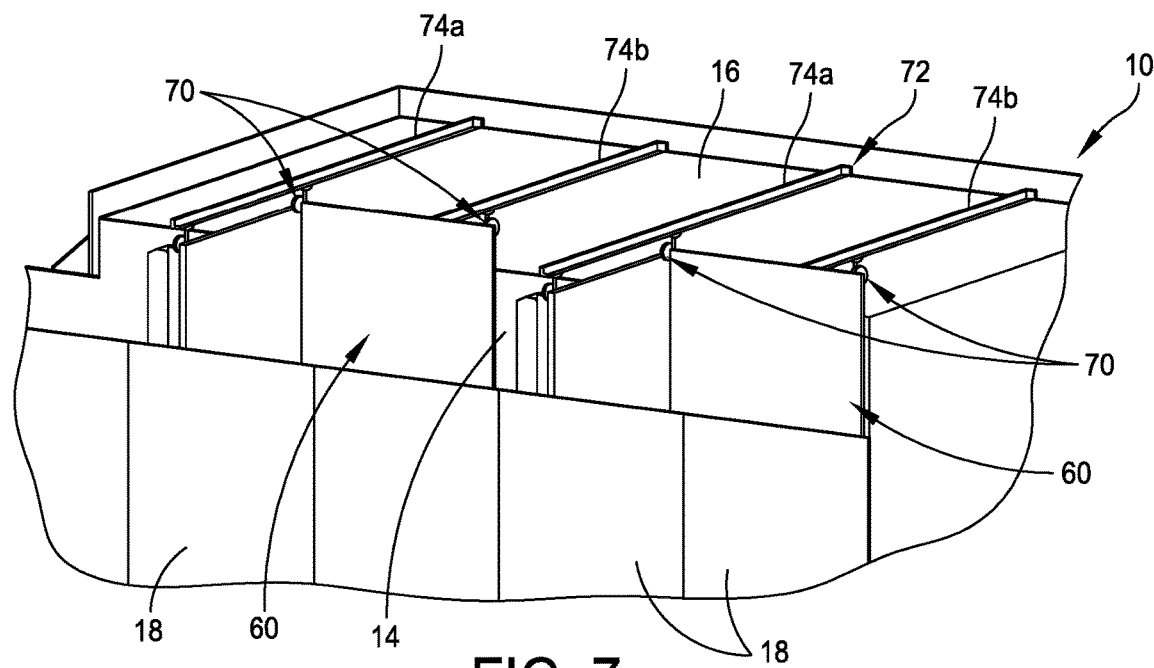
FIG. 7 is another perspective view of the modular data center looking toward a ceiling and an outer wall of the modular data center.

Referring to FIGS. 6 and 7, the cable tap box 60 is secured to the ceiling 16 of the modular data center 10 by clamp assemblies, each generally indicated at 70, that are configured to slide within a metal framing system 72 provided on the ceiling. In another embodiment, the cable tap box 60 can be placed directly on the switchgear 18. In the shown embodiment, the framing system includes two tracks 74a, 74b, which are spaced apart from one another a distance generally corresponding to a width of the cable tap box 60. The manner in which the cable tap box 60 is secured to the ceiling 16 will be described in detail with reference to FIGS. 24-27. The clamp assemblies 70 are configured to slide within the tracks 74a, 74b of the metal framing system 72, which in one embodiment is sometimes referred to as Unistrut® channels or framing, to enable the cable tap box 60 to be moved from a remote location to an operational position, as shown in FIG. 6.

In one embodiment, the shield 38 is designed to extend from the wall 14 to divert fluid, e.g., rain, from the busway 24 and busway interface connection 62 to the cable tap box 60. In one embodiment, the shield 38 is secured to the wall 14 and positioned over the busway 24 and the busway interface 62, and includes a top wall 76 and two side walls 78, 80 extending downwardly from the top wall (FIG. 2). A front edge of the top wall 76 of the shield 38 is bent downwardly to further prevent unwanted moisture, e.g., rain, from entering the space below the shield. The top wall 76 of the shield 38 is sized to span beyond a width of the shroud 34 and the cover 38 to protect the busway 24 and the busway interface 62. This is best shown in FIGS. 1 and 2.

Referring particularly to FIG. 7, two cable tap boxes 60 are secured to the ceiling 16 of the modular data center 10 by clamp assemblies 70 configured to slide within tracks 74a, 74b of two metal framing systems 72 provided on the ceiling. The cable tap boxes 60 are shown to be in their operational positions. Electronic equipment, typically switchgear 18, are shown to be positioned below the cable tap boxes 60. It should be understood that any number of cable tap boxes 60 and busways 24 may be provided depending on the size of the modular data center 10 and the number of transformers 20 and generators 22 provided.

Figure 8:
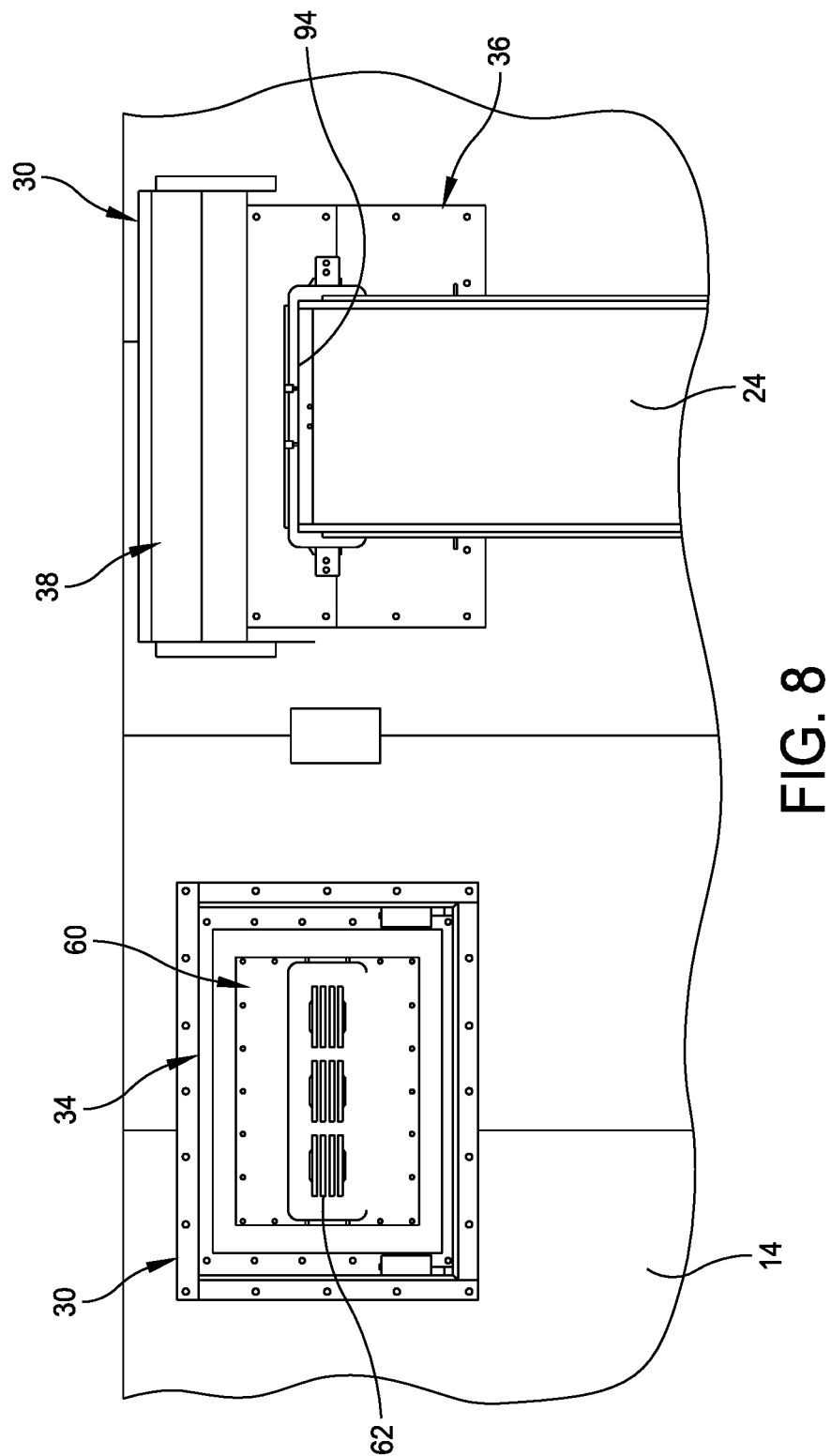
FIG. 8 is a front view of the modular data center showing a completed connection and one with parts removed to reveal the cable tap box.
Figure 9:
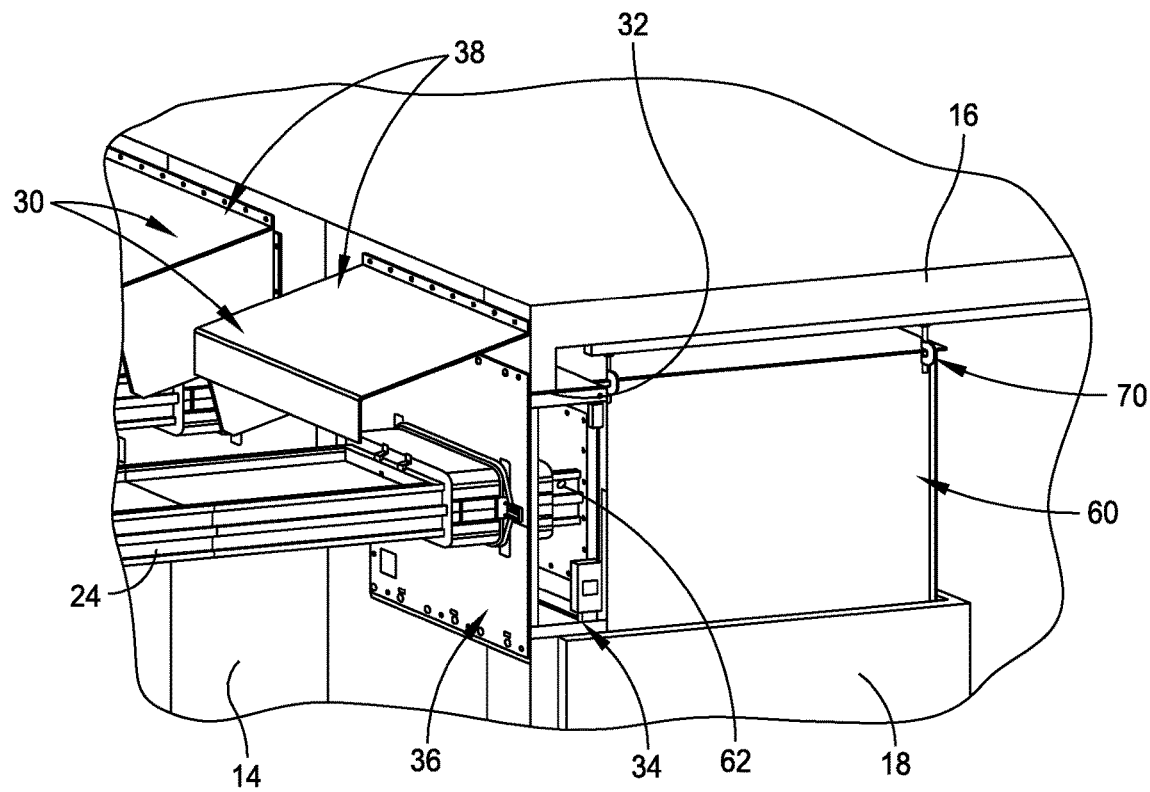
FIG. 9 is a cross-sectional perspective view of the modular data center looking in and down on the cable tap box.

Referring to FIG. 8, two assemblies 30 are shown to be provided on the exterior wall 14. The lefthand assembly 30 shows the shroud 34 connected to the outer surface of the exterior wall 14 of the modular data center 10 and to the cable tap box 60. The cable tap box interface 62 is presented to be coupled to the busway 24. The righthand assembly 30 shows the busway 24 connected to the cable tap box 60 and the cover 36 and the shield 38 secured to the shroud 34 and to the exterior wall 14, respectively. As shown, the cover 36 is configured to be secured to the plurality of outer edges of the shroud 34. The cover 36 has a cover opening 94 configured to enable the busway 24 to pass through the cover opening and to at least partially seal the interface of the cover opening and the busway. The cover opening 94 provided in the cover 36 is smaller than the opening 32 of the wall 14 and sized to accommodate the busway. FIG. 9 illustrates the cover 36 providing a seal to the busway 24.

Figure 10:
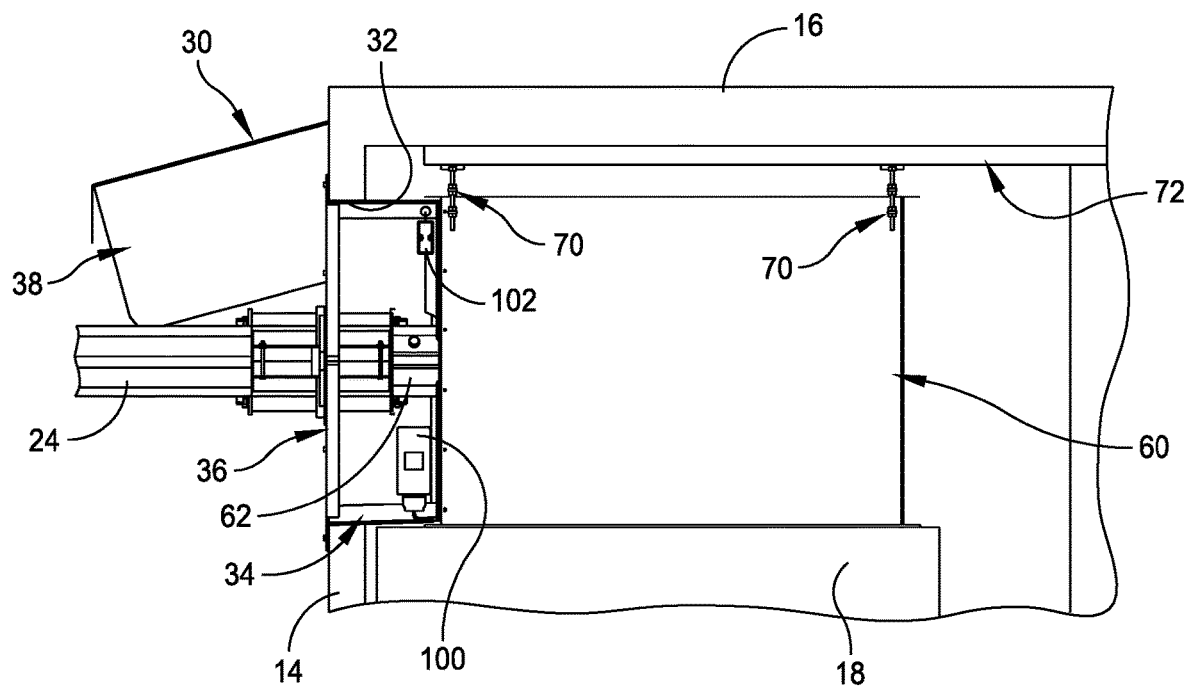
FIG. 10 is a side cross-sectional view of a portion of the modular data center showing a heater and a thermostat.

Referring to FIG. 10, the assembly further includes a heating system that is provided to heat the space within the shroud 34 that surrounds the interface 62 between the busway 24 and the cable tap box 60. In one embodiment, the heating system includes two dedicated heaters, each indicated at 100, secured to inner surfaces of the shorter side walls 40c, 40d of the shroud 34. FIG. 10 shows one heater 100 mounted on the inner surface of the shorter side wall 40c of the shroud below the busway interface 62. The other heater 100 is mounted on the inner surface of the opposite shorter side wall 40d of the shroud 34. The heaters 100 are connected to a thermostat 102 that is also mounted on the inner surface of one of the shorter side walls 40c, 40d of the shroud 34, e.g., side wall 40c. The thermostat 102 is provided to control the heaters 100 to achieve a desired temperature within the shroud 34. In one embodiment, the thermostat 102 can be wirelessly controlled so that the assembly 30, when fully assembled, can remain intact. In another embodiment, the thermostat 102 can be controlled by a controller associated with the modular data center 10. The heaters 100 are provided to address moisture within the shroud that surrounds the cable tap box interface connection 62. A humidity sensor can also be provided within the space defined by the shroud 34 as well.

Figure 11:
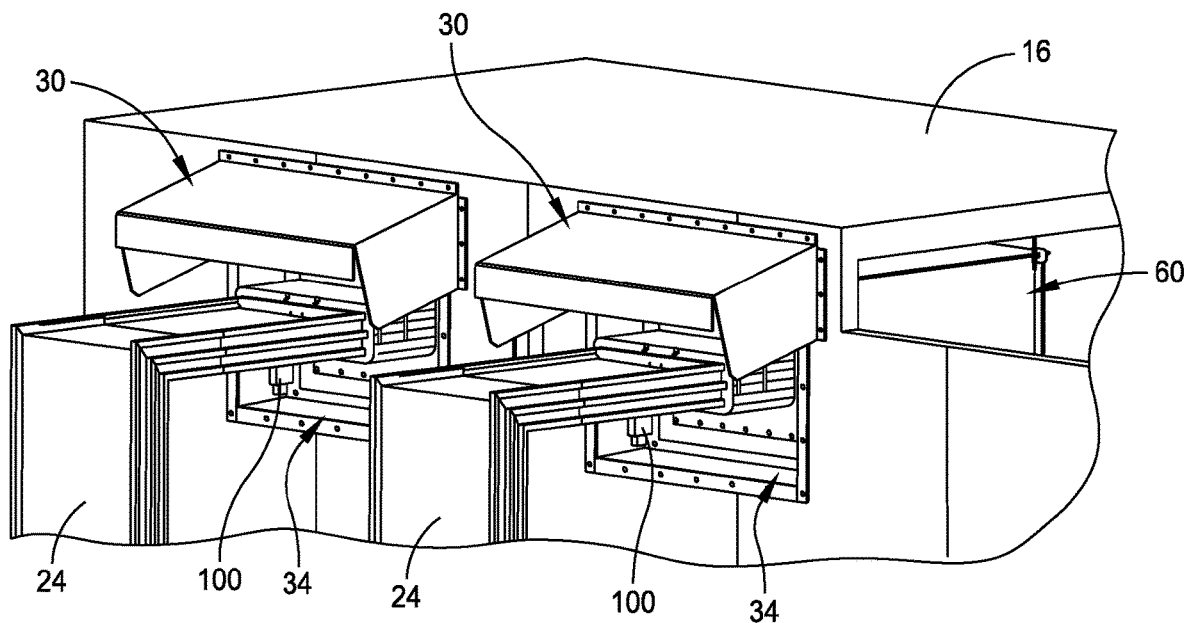
FIG. 11 is a perspective view of a portion of the modular data center showing the heaters for each shroud.
Figure 12:
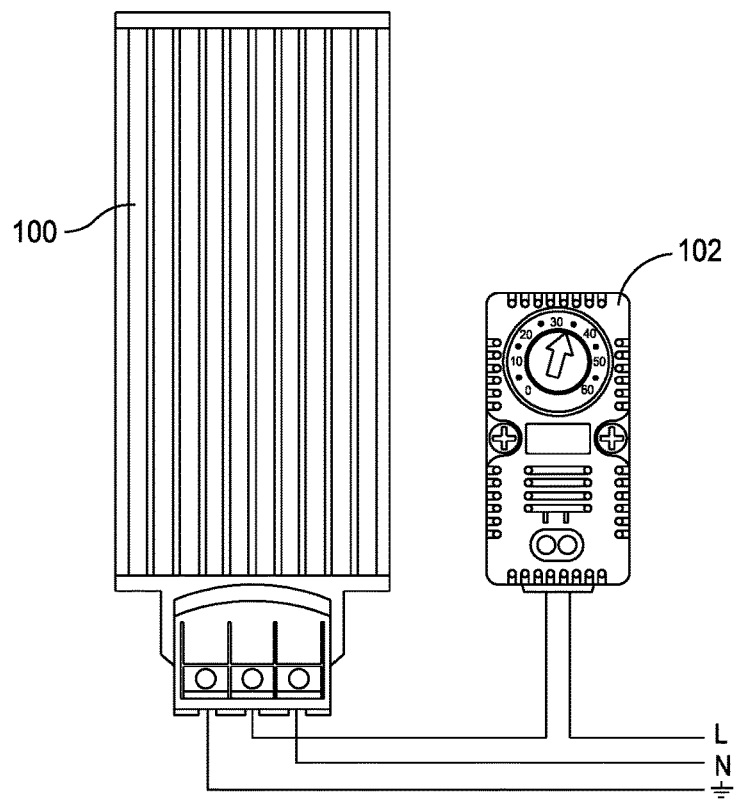
FIG. 12 is a front view of the heater and the thermostat.

Referring to FIG. 11, each assembly 30 is shown with its respective cover 36 removed. Each assembly 30 is provided with its own heating system that includes the two heaters 100 and two thermostats 102 per assembly. The heating system can be provided for each cable tap box 60 and busway interface 62. Referring to FIG. 12, in one embodiment the heater system includes two ClimaSys 55W heaters and a single ClimaSys CC-simple thermostat, each being provided by Schneider Electric. The heater 100 is a resistance heater and configured to provide localized heat to the space defined by the shroud 34. As shown, the thermostat 102 is suitably connected to the heater 100 (wired or wirelessly) to provide control to the heater.

Figure 13A:
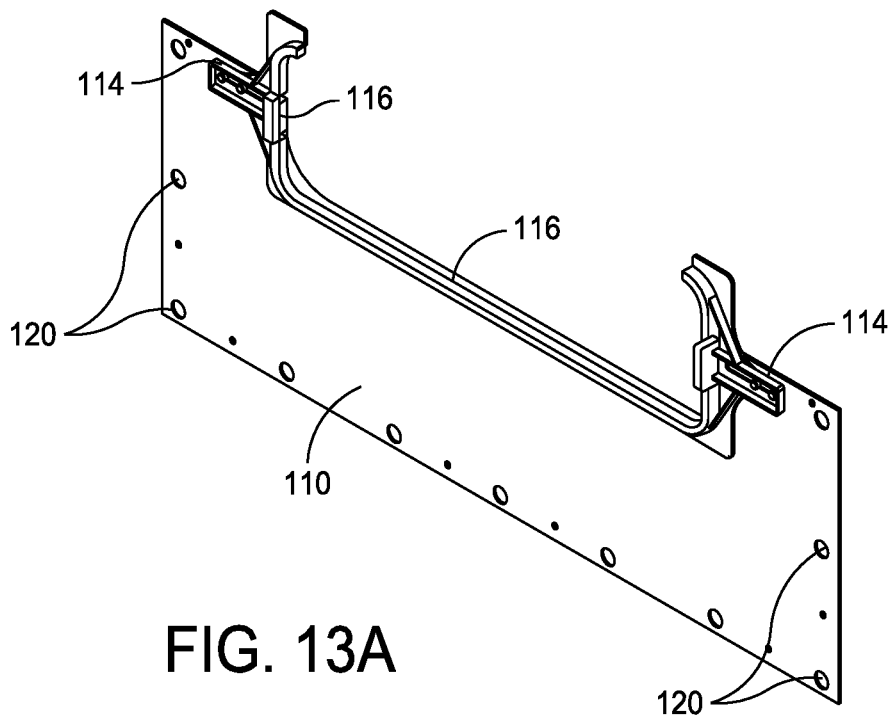
FIG. 13A is front perspective view of a top part of an outer cover of an embodiment of the present disclosure.
Figure 13B:
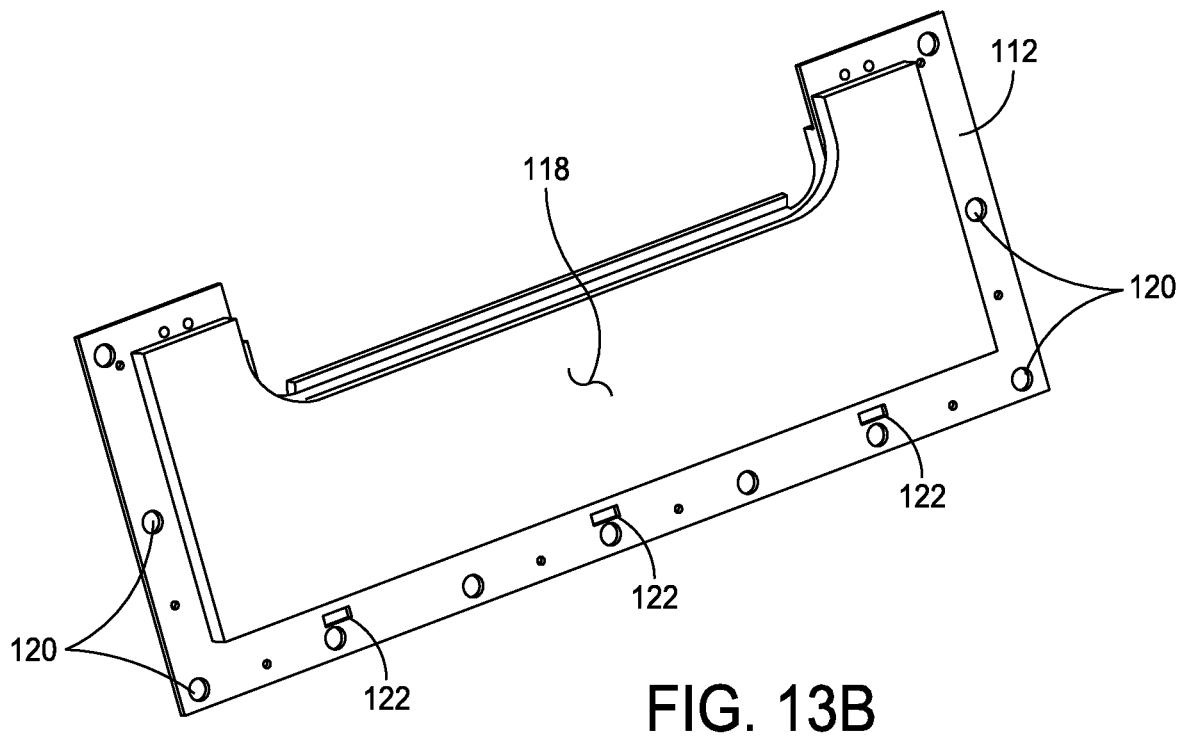
FIG. 13B is a back perspective view of a bottom part of the cover of an embodiment of the present disclosure.

Referring to FIGS. 13A and 13B, in one embodiment, the cover 36 includes a top part 110 shown in FIG. 13A and a bottom part 112 shown in FIG. 13B. The top part 110 and the bottom part 112, when assembled on the shroud 34, together define the cover opening 94 that is centrally provided within the cover 36. The top part 110 of the cover 36 includes two slider plates, each indicated at 114, which are provided to enclose the sides of the cover opening around the busway 24 once the cover is secured to the shroud 34. When assembled, the cover opening 94 of the cover 36 is sized to seal against the busway 24. The slider plates 114 can be adjusted in a lateral or horizontal direction to adjust a size of the cover opening 94 to engage the busway 24 as it passes through the cover opening. In one embodiment, the top part 110 and the bottom part 112 of the cover 36 each includes a foam gasket 116 surrounding the cover opening 94 to provide a seal or at a minimum at least a partial seal between the cover and the busway 24. The backside of the cover 36 is covered with insulation material 118 to prevent or minimize heat loss within the shroud 34 once the cover is installed.

The top part 110 and the bottom part 112 of the cover 36 further includes several openings, each indicated at 120, provided around the peripheries of the top part and the bottom part of the cover to secure the cover to the shroud 34. In one embodiment, the top part 110 and the bottom part 112 of the cover 36 can be secured by fasteners, such as machine screw or sheet metal screw fasteners. Several drain slots, each indicated at 122, are provided along the periphery of the bottom part 112 of the cover 36 to serve as drain holes to enable fluid to flow from the cover once the cover is installed on the shroud 34.

Figure 14:
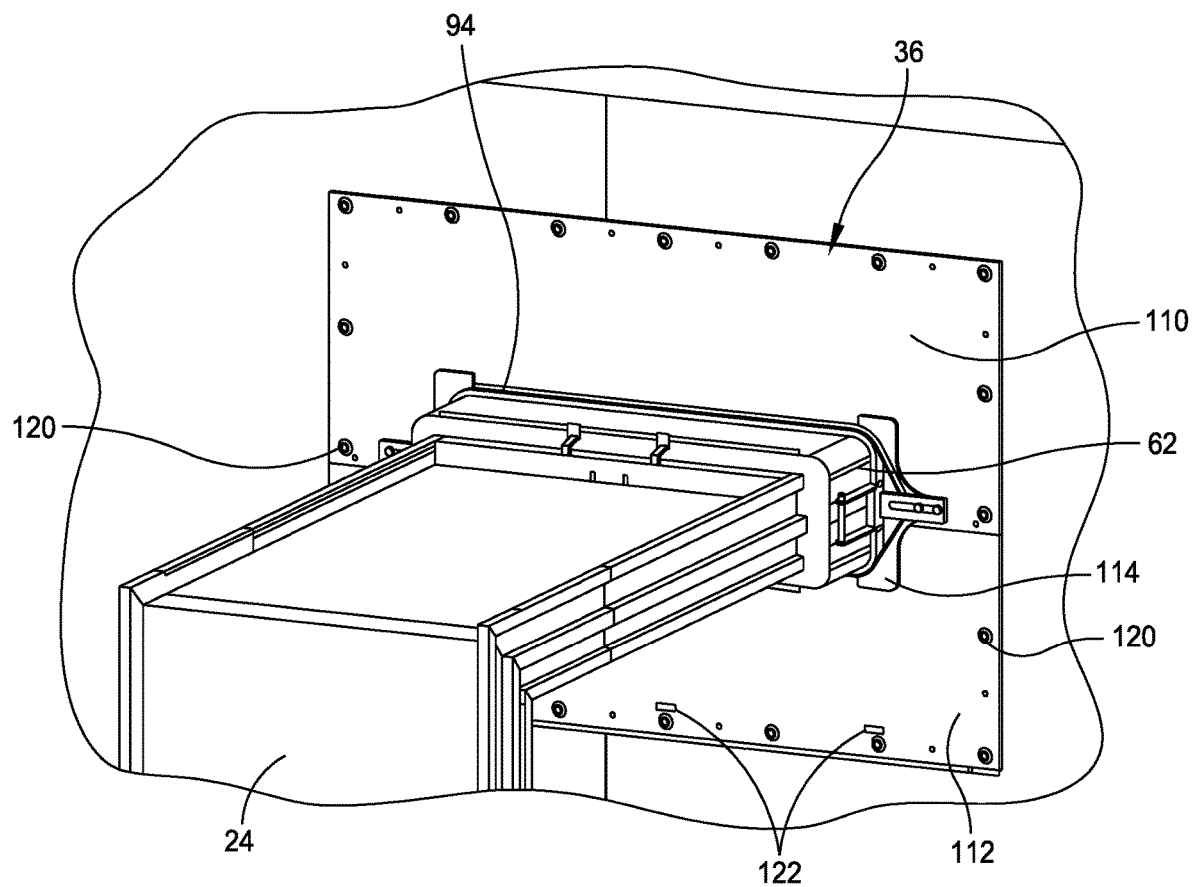
FIG. 14 is an enlarged perspective view of a portion of the modular data center showing the assembled cover and a busway extending through the cover.

Referring to FIG. 14, the slider plates 114 of the cover 36 are shown to be mounted on the body of the cover on each side of the cover opening 94 adjacent the cover opening. The slider plates 114 are provided to improve the seal between the busway 24 and the cover 36. Each slider plate 114 is laterally adjustable to engage the side edge of the busway 24 or busway interface 62 to prevent moisture from entering the shroud 34. Each slider plate 114, once adjusted in place, can be locked in place by a lock nut or some other locking device to secure the slider plate against the busway 24 or the busway interface 62. The drain slots 122 are located below the busway 24 adjacent to a bottom edge of the bottom part 112 of the cover 36. The openings 120 along the periphery of the top part 110 and the bottom part 112 of the cover 36 can be shared with the shroud 34 to secure the shroud and the cover in place with the fasteners.

Figure 15:
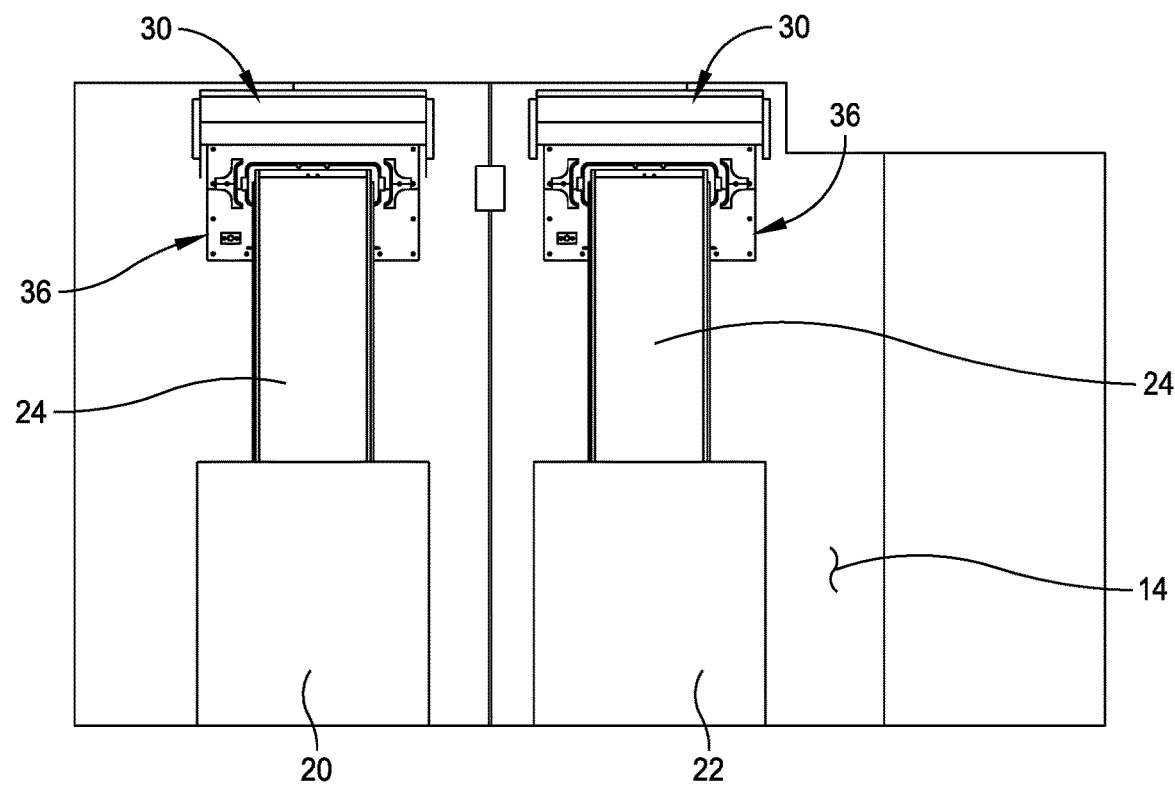
FIG. 15 is a front view of the modular data center showing the assembled cover and shields.

Referring to FIG. 15, the covers 36 are mounted on the shroud 34 to illustrate the completed assembly. In one embodiment the lefthand assembly protects the busway 24 that is provided to connect the transformer 20 to the cable tap box 60 and the righthand assembly protects the busway that is provided to connect the generator 22 to the cable tap box. The rain shields 38 are provided to protect the busways 24 and the interfaces 62 of the busways. It should be understood that the busways 24 can be used to connect any type of electrical equipment, and the provision of the transformer 20 and the generator 22 are exemplary only.

Figure 16:
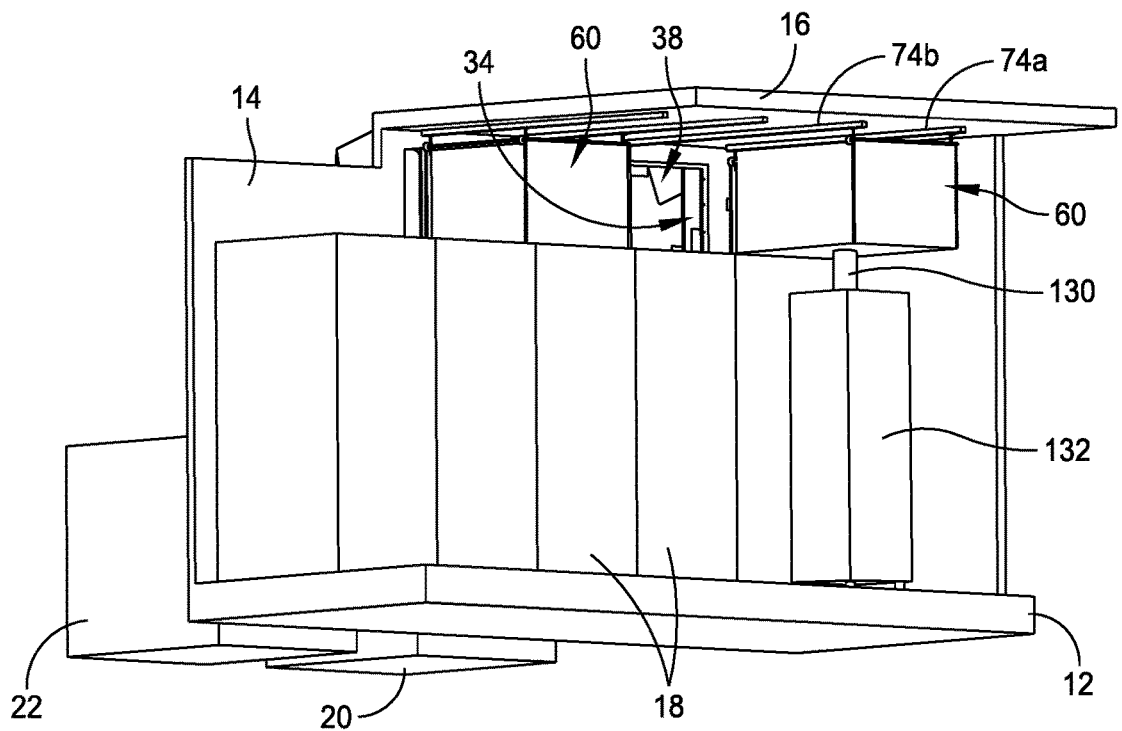
FIG. 16 is a back perspective view of a portion of the modular data center showing the installation of the cable tap box and a method of lifting and supporting the cable tap box into position.
Figure 17:
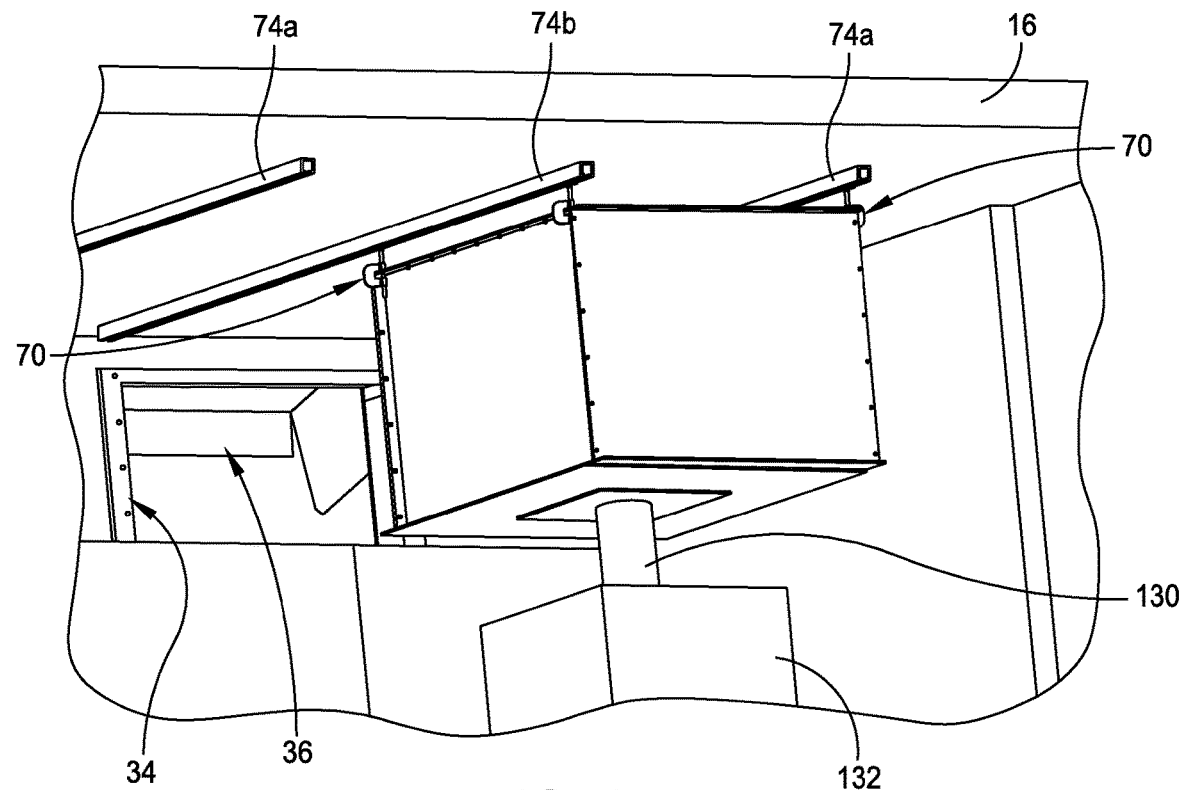
FIG. 17 is an enlarged back perspective view of the portion of the modular data center shown in FIG. 16.
Figure 18:
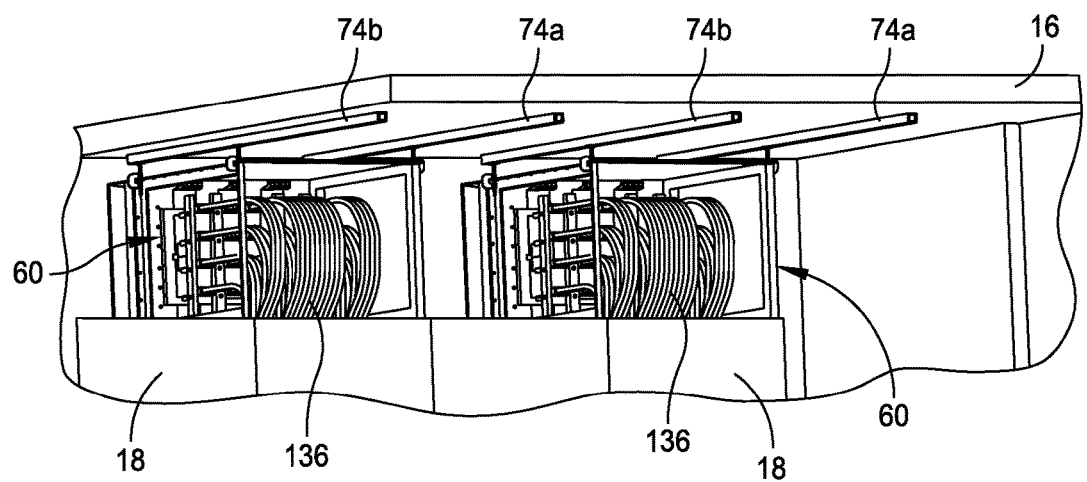
FIG. 18 is an enlarged back perspective view of a portion of the modular data center showing the cable tap boxes readied for cable installation.
Figure 19:
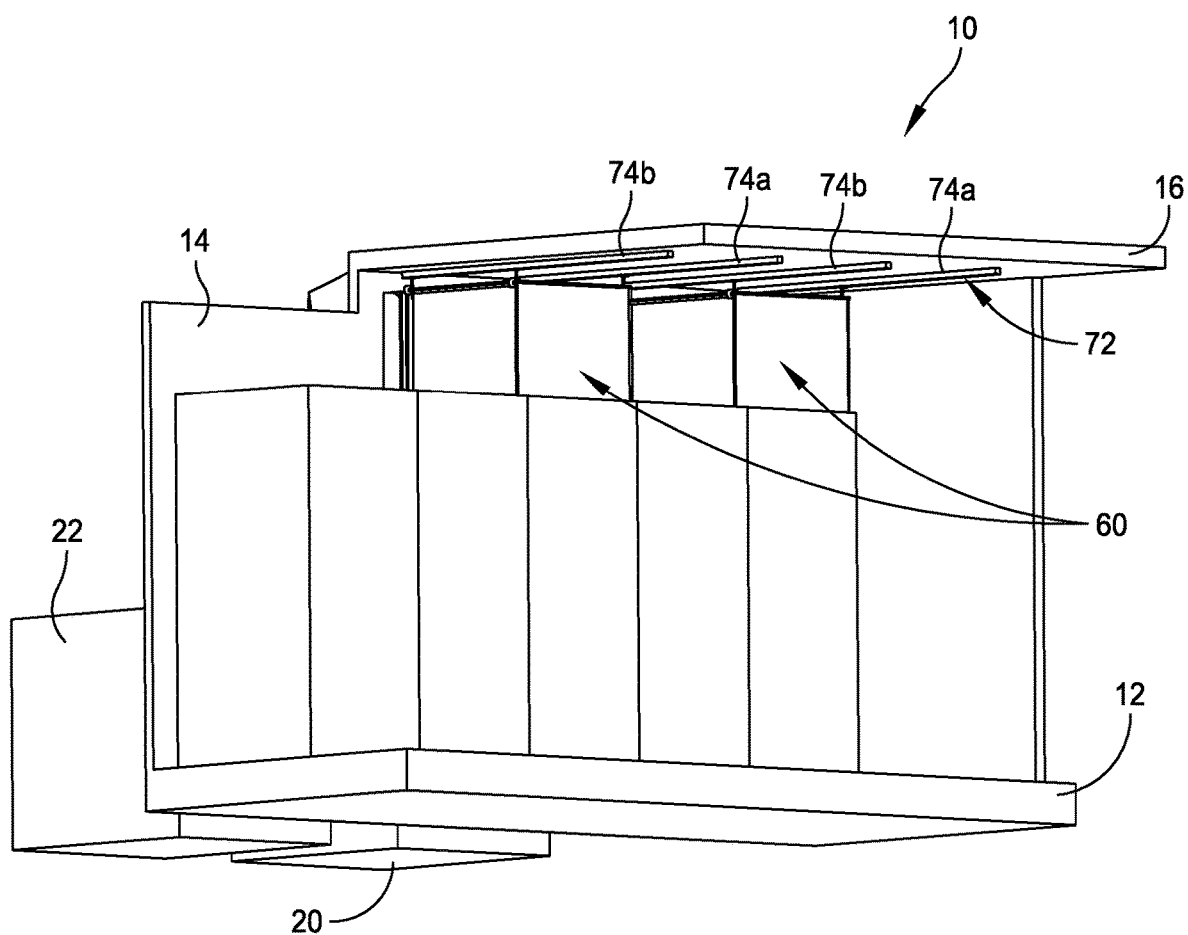
FIG. 19 is a back perspective view of a portion of the modular data center showing the cable tap boxes each in an installed position.

Referring to FIGS. 16-19, the manner in which the cable tap boxes 60 are installed is shown and described below. As shown in FIG. 16, the modular data center 10 includes several switchgear modules 18 aligned in a row along the wall 14 of the modular data center. One cable tap box 60 is shown to be fully installed above the switchgear modules 18 in a position in which the cable tap box is adjacent to the wall 14. As shown in FIGS. 16 and 17, the other cable tap box 60 is shown in a pre-installation position in which the cable tap box is supported by an equipment jack 130 that is provided on a roller base 132. The equipment jack 130 is configured to lift the cable tap box 60 toward the ceiling 16 for installation, while the roller base 132 is provided to laterally move or roll the equipment jack and the cable tap box to its desired, operational position. The cable tap box 60 is positioned within an aisle of the modular data center 10 behind the row of switchgear modules 18 and secured by suitable hardware, e.g., clamp assemblies 70, to the tracks 74a, 74b of the framing system 72 provided on the ceiling 16. As shown in FIGS. 18 and 19, the cable tap box 60 is moved into the fully installed position within the framing system 72 and suitable clamped in place against the opening 32 in the wall 14 that receives the shroud 34. Each cable tap box 60 includes cables 136 that are provided to connect the cable tap boxes to the switchgear 18.

Figure 20:
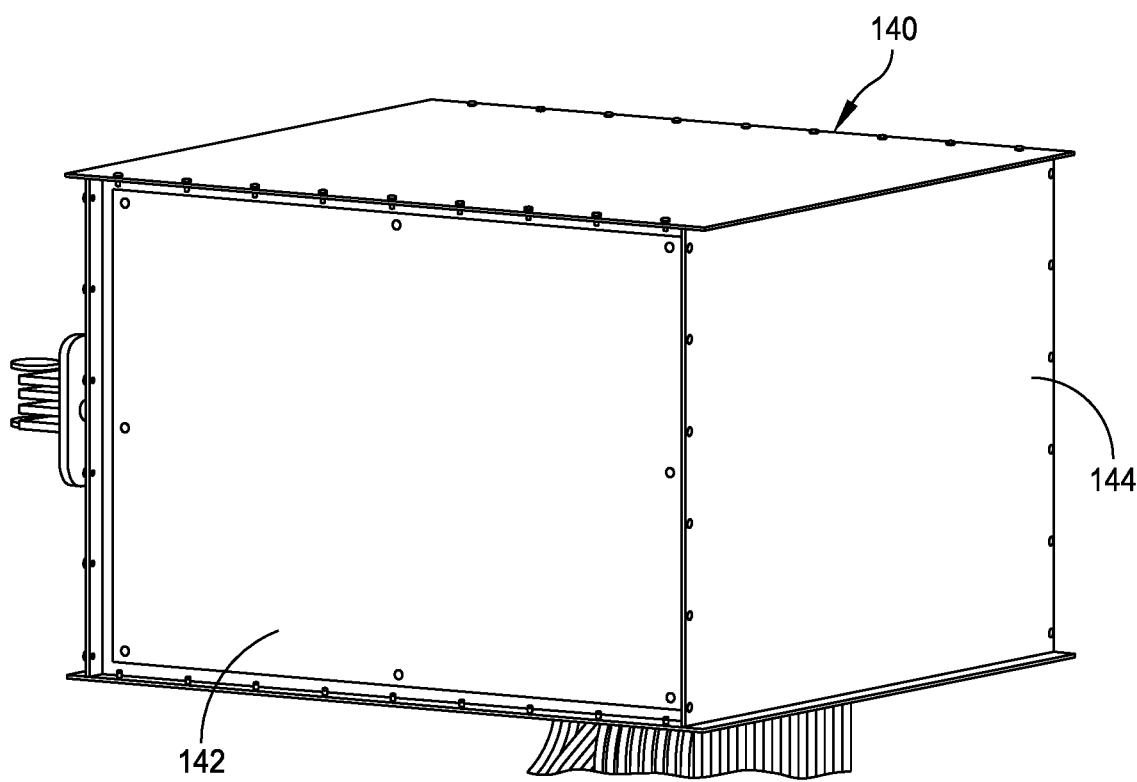
FIG. 20 is a perspective view of a cable tap box showing removable panels of the cable tap box.

Referring to FIG. 20, a modified cable tap box is indicated at 140, the modified cable tap box having a side panel 142 provided on both sides of the cable tap box. Each side panel 142 is configured to be removed by removing fasteners used to secure the side panel to a frame of the cable tap box. A back panel 144 is configured to be removed as well. The removable side panels 142 and the back panel 144 are provided to easily access the interior of the cable tap box 140 after the cable tap box is installed in its operable position.

Figure 21:
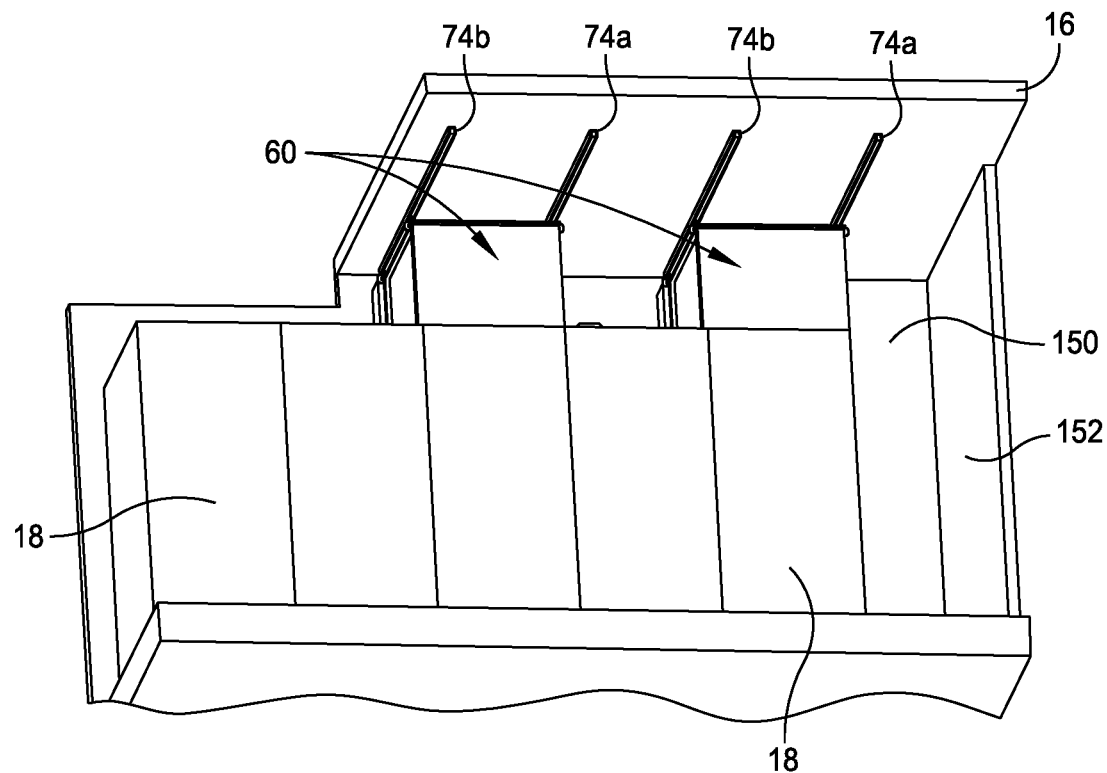
FIG. 21 is another back perspective view of a portion of the modular data center showing rails to install the cable tap box to allow the cable tap box to be slid into position above switchgear.

Referring to FIG. 21, when installing the cable tap boxes 60, a gap indicated at 150 can be provided adjacent to a wall 152 of the modular data center 10 and an outer edge of the cable tap box. This gap 150 can enable accessories, hardware and cabling to be installed adjacent to the cable tap box 60. In one embodiment, the gap 150 is 30-inches wide, but any size gap can be provided. As shown, the switchgear 18 similarly are positioned in the modular data center 10 a distance from the wall 152 that is the same distance as the gap 150 between the wall and the cable tap box.

Figure 22:
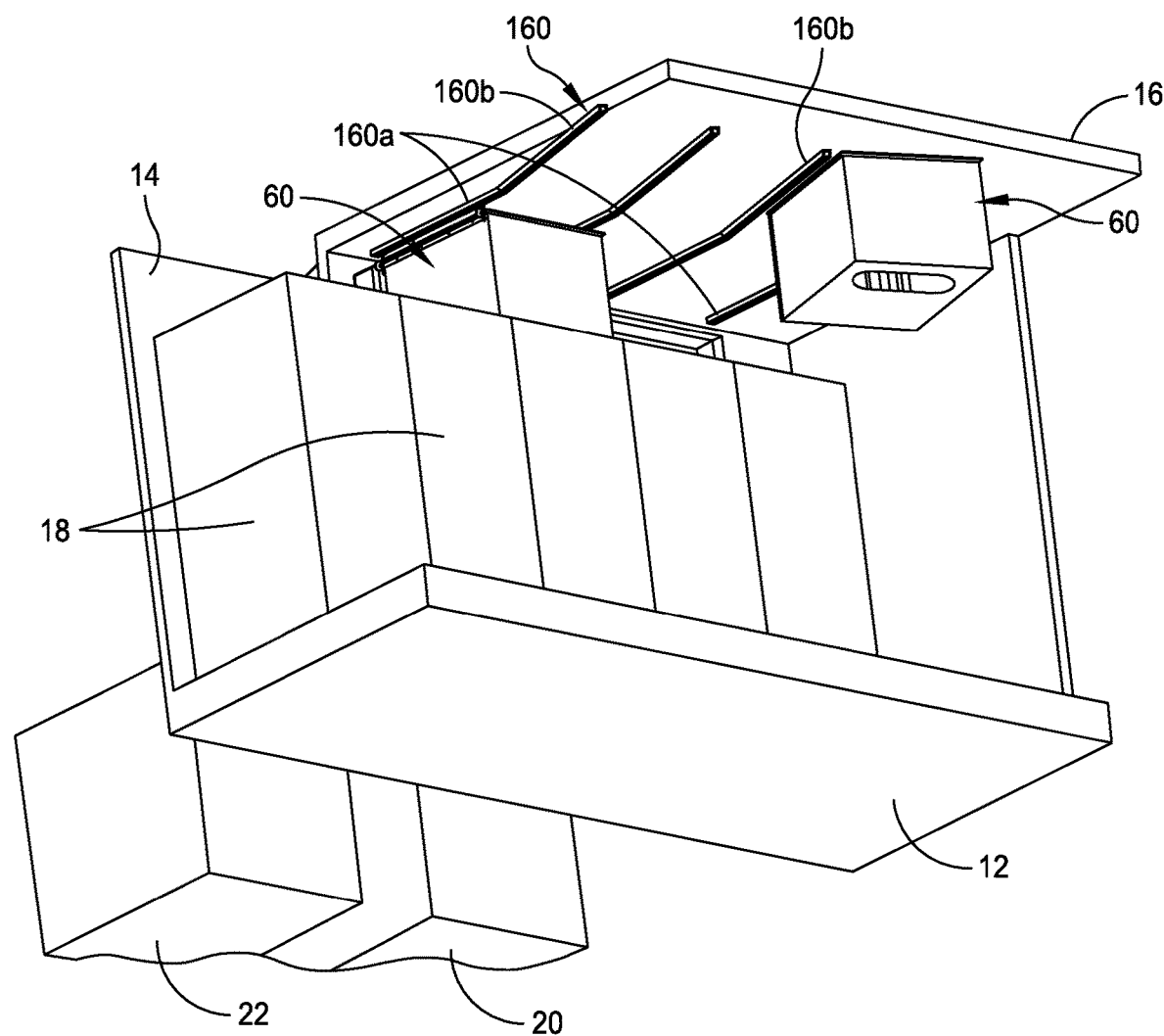
FIG. 22 is another back perspective view of a portion of the modular data center showing another method of installing the cable tap boxes.

Referring to FIG. 22, in one embodiment, a modified framing system 160 can be provided. As shown, the modified framing system generally indicated at 160 is angled to account for a small gap provided between the cable tap box 60 and the outer edge of the equipment rack 18 and the wall 152 of the modular data center 10. As shown, a first portion 160a of the framing system 160 is relatively perpendicular to the wall adjacent to the wall 14 to position the cable tap box 60 in place once fully installed. However, a second portion 160b of the framing system 160 is angled with respect to the first portion 160a to enable better access to the cable tap box 60 when the cable tap box is in the pre-installation position. Specifically, in one embodiment, angled framing system 160 can be provided to achieve a small gap, e.g., six inches, from the wall 152 to enable the manipulation and access to the cable tap box 60.

Figure 23:
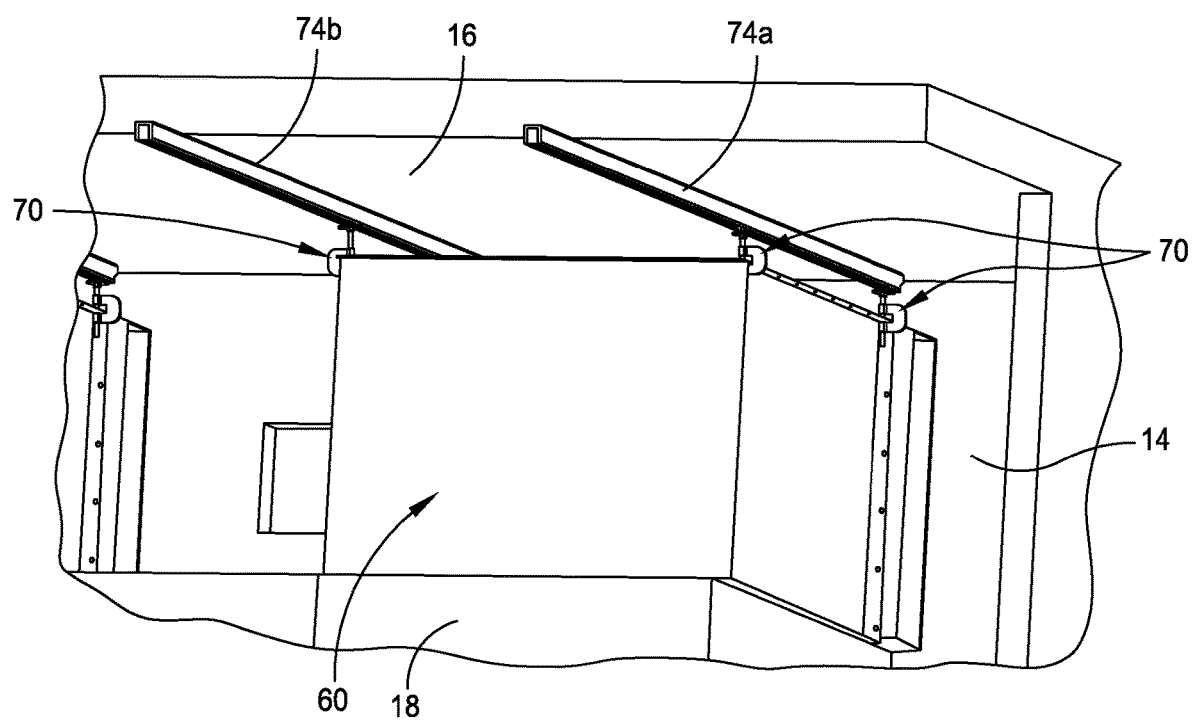
FIG. 23 is an enlarged perspective view of a portion of the modular data center showing hardware used to mount the cable tap box in place.
Figure 24:
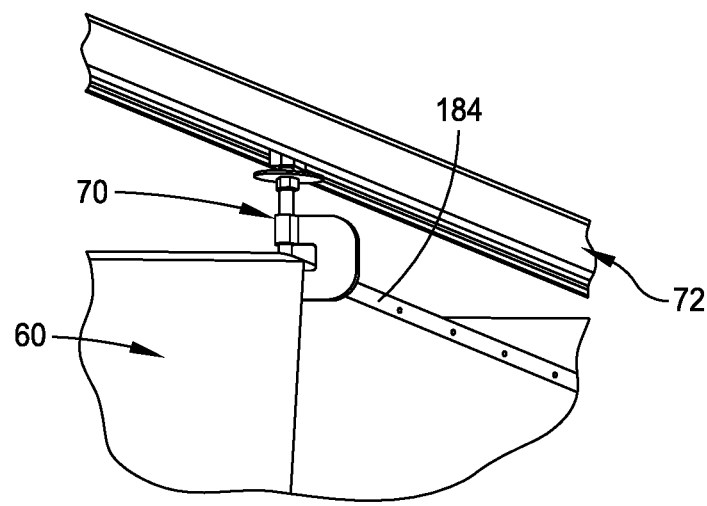
FIG. 24 is an enlarged perspective view of a framing system and a clamp used to support the cable tap box.

Referring to FIGS. 23 and 24, in one embodiment, the cable tap box 60 is secured to the ceiling 16 by the aforementioned clamp assemblies and framing system 72. The clamp assemblies 70 are configured to clamp onto the cable tap box 60 to support the weight of the cable tap box. As shown in FIG. 23, four clamp assemblies 70 can be used to secure the cable tap box 60, with a clamp assembly being provided at each corner of the cable tap box. The weight of the cable tap box 60 can be somewhat substantial, e.g., 400+ pounds (lbs). Thus, the ceiling 16 and each clamp assembly 70 must be sufficiently robust to carry its portion of the weight of the cable tap box 60. Moreover, the tracks 74a, 74b of the framing system 72 must be robust enough to support the weight of the clamp assemblies 70 and the cable tap box 72. The clamp assemblies 70 further are configured to be coupled to the tracks 74a, 74b of the framing system 72 to enable the cable tap box 60 to ride along a length of the framing system between the aforementioned pre-installation and installed positions.

Figure 25:
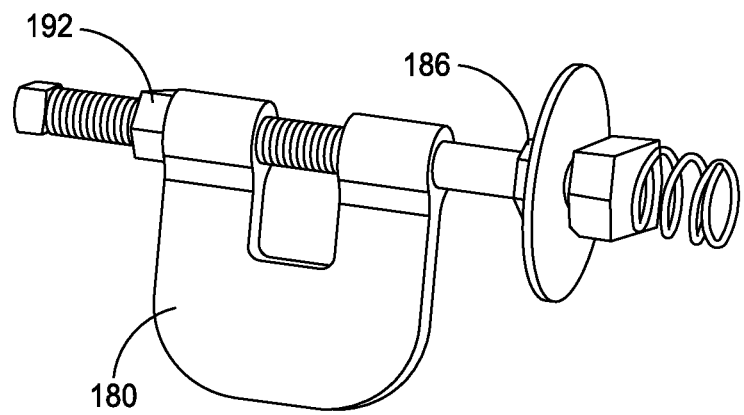
FIG. 25 is a perspective view of the clamp.
Figure 26:
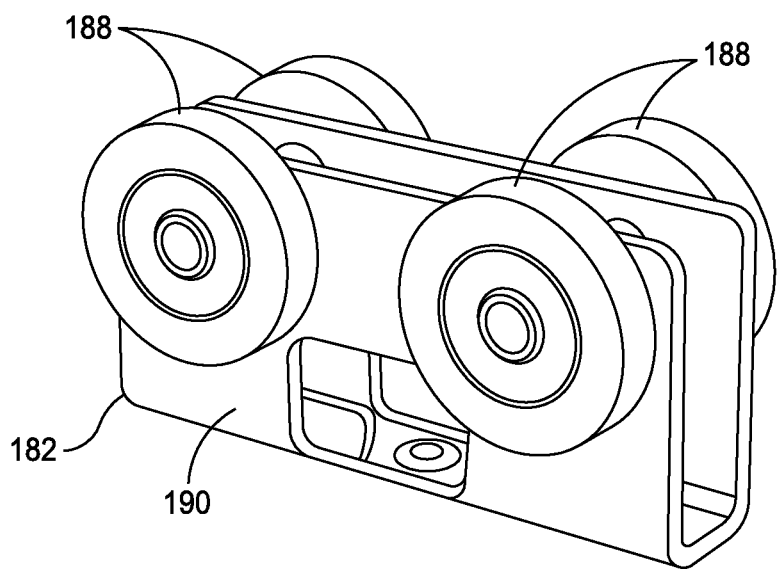
FIG. 26 is a perspective view of a roller assembly.

Referring additionally to FIGS. 25 and 26, each clamp assembly 70 includes a clamp 180 (FIG. 25) that is secured to the track or rail of the framing system 72 (which is greased) or is secured to a roller assembly 182 (FIG. 26). In one embodiment, the clamp 180 is a C-clamp in which a throat of the clamp can be widened to enable a flange 184 of the cable tap box 60 to be inserted within the clamp. The clamp 180 is tightened to firmly secure the clamp to the flange 184 of the cable tap box 60. The manner in which the clamp 180 is secured to the cable tap box 60 is shown in FIG. 24. Each clamp 180 can be locked in place by a nut 186 provided on the clamp. Alternatively, the roller assembly 182, which includes four rollers or wheels, each indicated at 188, can be configured to ride within a channel of the track 74a or 74b of the framing system 72. The roller assembly 182 further includes a bracket 190 that can be secured to the clamp 180. Another nut 192 is provided on the clamp 180 to firmly secure the clamp to the cable tap box 60. Once assembled, the clamp hardware or the roller assembly 182 is configured to slide or roll along a length of the track 74a or 74b of the framing system 72 while the clamp 180 is secured to the cable tap box 60 to move the cable tap box to a desired location.

A method of assembling a busway cable assembly to protect a busway configured to be coupled to an electrical box is further disclosed. As discussed above, the busway transition of the cable tap box extends through an opening of an outer wall of a modular data center, and is provided to connect equipment within the modular data center, e.g., switchgear, to a transformer or a generator. In one embodiment, the method includes installing a shroud on the wall with the shroud extending through the opening of the wall. The shroud includes a plurality of outer edges that are secured to an outer surface of the outer wall and a plurality of inner edges that are secured to the cable tap box. Inner surfaces of the plurality of outer edges each include a seal configured to engage the outer surface of the outer wall.

The method further includes installing a cover to the shroud. The cover includes a cover opening that is sized to enable the busway to pass through the cover opening. The cover is provided to at least partially seal the opening of the outer wall having the busway extending through. Specifically, the cover is secured to the plurality of outer edges of the shroud and can include a gasket to create at least a partial seal between the busway and the cover. Further, the cover can include slider plates at each end of the cover opening to improve the seal between the busway and the cover.

The method further includes installing a shield to the outer wall, with the shield being positioned over the busway. The shield protects the connection of the busway to the cable tap box interface. The method further includes installing at least one heater to a wall of the shroud and a thermostat, coupled to the heater, to the wall or another wall of the shroud. The thermostat controls the heater.

Thus, it should be understood that the assembly described herein enables a busway to pass through an exterior wall of a modular data center to allow contractors to continue the busway connections outside the facility, for example, to a generator or a transformer, without the need to enter a locked facility. The system allows a busway connection through a wall, behind access panels, to permit system checkout in advance and keep contractors from requiring access inside a locked facility.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A modular data center comprising:
   an outer wall having an opening formed therein, the opening being configured to enable a busway to pass through the outer wall;
   an electrical box configured to be coupled to the busway, the electrical box being positioned inboard with respect to the outer wall;
   a shroud configured to extend through the opening of the outer wall, the shroud including a plurality of outer edges configured to be coupled to an outer surface of the outer wall; and
   a cover, including a cover opening, configured to enable the busway to pass through the cover opening, and to at least partially seal the opening of the outer wall having the busway passing therethrough.

2. The modular data center of claim 1, wherein the shroud includes a plurality of walls that extend in a direction generally perpendicular to the plurality of outer edges.

3. The modular data center of claim 2, wherein the plurality of outer edges extends in an outboard direction with respect to the outer wall.

4. The modular data center of claim 2, wherein a bottom wall of the plurality of walls of the shroud is sloped downwardly toward the plurality of outer edges.

5. The modular data center of claim 1, wherein inner surfaces of the plurality of outer edges each include a seal configured to engage the outer surface of the outer wall.

6. The modular data center of claim 1, wherein the shroud further includes a plurality of inner edges configured to be coupled to the electrical box.

7. The modular data center of claim 6, wherein the plurality of inner edges extends in an inboard direction with respect to the outer wall.

8. The modular data center of claim 1, wherein the cover is configured to be secured to the plurality of outer edges of the shroud.

9. The modular data center of claim 1, wherein the cover opening is sized to receive the busway, the cover opening including a gasket to create at least a partial seal between the busway and the cover.

10. The modular data center of claim 9, wherein the cover further includes at least one slider plate mounted on the cover adjacent an edge of the opening, the at least one slider plate being configured to improve the seal between the busway and the cover.

11. The modular data center of claim 1, wherein the cover includes one or more slots formed along a bottom edge of the cover.

12. The modular data center of claim 1, further comprising a shield secured to the outer wall and positioned over the busway.

13. The modular data center of claim 12, wherein the shield includes a top wall and two side walls extending downwardly from the top wall.

14. The modular data center of claim 1, further comprising at least one heater secured to a wall of the shroud.

15. The modular data center of claim 14, further comprising a thermostat coupled to the at least one heater, the thermostat being configured to control the at least one heater.

16. The modular data center of claim 14, wherein the at least one heater includes two heaters.

17. The modular data center of claim 1, further comprising a ceiling coupled to the outer wall, the ceiling including at least one support member configured to support the electrical box.

18. The modular data center of claim 17, further comprising a clamp configured to secure the electrical box, the clamp being coupled to the at least one support member to enable the electrical box slide with respect to the ceiling.

19. An assembly to protect a busway configured to be coupled to an electrical box, the busway extending through an opening of an outer wall of a modular data center, the assembly comprising:
   a shroud configured to extend through the opening of the outer wall, the shroud including a plurality of outer edges configured to be coupled to an outer surface of the outer wall; and
   a cover, including a cover opening, configured to enable the busway to pass through the cover opening, and to at least partially seal the opening of the outer wall having the busway extending therethrough.

20. The assembly of claim 19, wherein the shroud includes a plurality of walls that extend in a direction generally perpendicular to the plurality of outer edges.

21. The assembly of claim 20, wherein the plurality of outer edges extends in an outboard direction with respect to the plurality of walls.

22. The assembly of claim 20, wherein a bottom wall of the plurality of walls of the shroud is sloped downwardly toward the plurality of outer edges.

23. The assembly of claim 19, wherein inner surfaces of the plurality of outer edges each include a seal configured to engage the outer surface of the outer wall.

24. The assembly of claim 19, wherein the shroud further includes a plurality of inner edges configured to be coupled to the electrical box.

25. The assembly of claim 24, wherein the plurality of inner edges extends in an inboard direction with respect to the outer wall.

26. The assembly of claim 19, wherein the cover is configured to be secured to the plurality of outer edges of the shroud.

27. The assembly of claim 19, wherein the cover opening is sized to receive the busway, the cover opening including a gasket to create at least a partial seal between the busway and the cover.

28. The assembly of claim 27, wherein the cover further includes at least one slider plate mounted on the cover adjacent an edge of the opening, the at least one slider plate being configured to improve the seal between the busway and the cover.

29. The assembly of claim 19, wherein the cover includes one or more slots formed along a bottom edge of the cover.

30. The assembly of claim 19, further comprising a shield secured to the outer wall and positioned over the busway.

31. The assembly of claim 30, wherein the shield includes a top wall and two side walls extending downwardly from the top wall.

32. The assembly of claim 19, further comprising at least one heater secured to a wall of the shroud.

33. The assembly of claim 32, further comprising a thermostat coupled to the at least one heater, the thermostat being configured to control the at least one heater.

34. The assembly of claim 32, wherein the at least one heater includes two heaters.

* * * * *